(12) United States Patent
Kawano et al.

(10) Patent No.: US 11,325,441 B2
(45) Date of Patent: May 10, 2022

(54) SEAT AIR CONDITIONER

(71) Applicant: DENSO CORPORATION, Kariya (JP)

(72) Inventors: Shigeru Kawano, Kariya (JP); Koji Ota, Kariya (JP); Aun Ota, Kariya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 16/529,254

(22) Filed: Aug. 1, 2019

(65) Prior Publication Data

US 2019/0351735 A1  Nov. 21, 2019

Related U.S. Application Data

(63) Continuation of application No. PCT/JP2017/044463, filed on Dec. 12, 2017.

(30) Foreign Application Priority Data

Feb. 14, 2017  (JP) .............................. JP2017-024700

(51) Int. Cl.
*B60H 1/00* (2006.01)
*B60H 1/03* (2006.01)

(52) U.S. Cl.
CPC ..... *B60H 1/00285* (2013.01); *B60H 1/00478* (2013.01); *B60H 1/03* (2013.01)

(58) Field of Classification Search
CPC .............. B60H 1/00285; B60N 2/5642; B60N 2/5657; B60N 2/565; B60N 2/5635
See application file for complete search history.

(56) References Cited

U.S. PATENT DOCUMENTS

| 8,136,874 B2 * | 3/2012 | Negrini ................ B60N 2/5692 |
| | | 297/180.11 |
| 8,256,236 B2 * | 9/2012 | Lofy ....................... F28D 15/00 |
| | | 62/150 |
| 10,603,976 B2 * | 3/2020 | Androulakis ........ B60H 1/3204 |
| 2002/0105213 A1 * | 8/2002 | Rauh .................... B60N 2/5685 |
| | | 297/180.14 |

(Continued)

FOREIGN PATENT DOCUMENTS

| JP | 2001-354029 A | 12/2001 |
| JP | 2006131106 A | 5/2006 |

(Continued)

*Primary Examiner* — Gordon A Jones
(74) *Attorney, Agent, or Firm* — Harness, Dickey & Pierce, P.L.C.

(57) ABSTRACT

The seat air conditioner configured to supply conditioning air to a seat in a vehicle cabin includes a refrigeration cycle, an air blower, and a conditioning air supply unit. The refrigeration cycle includes a compressor that compresses and discharges a refrigerant, a heat emitting portion that emits heat of the refrigerant discharged from the compressor to generate a warm air, a decompressor that decompresses the refrigerant flowing out of the heat emitting portion, and a heat absorbing portion that evaporates the refrigerant decompressed by the decompressor to generate a cold air. The air blower blows air to exchange heat with the refrigerant. The conditioning air supply unit supplies each of the warm air generated by the heat emitting portion and the cold air generated by the heat absorbing portion as the conditioning air to the seat.

8 Claims, 13 Drawing Sheets

(56) References Cited

U.S. PATENT DOCUMENTS

| | | | | |
|---|---|---|---|---|
| 2006/0273646 | A1* | 12/2006 | Comiskey | B60N 2/5628 |
| | | | | 297/408 |
| 2008/0016892 | A1* | 1/2008 | Jang | B60N 2/5628 |
| | | | | 62/244 |
| 2009/0008970 | A1* | 1/2009 | Flory | B60N 2/5657 |
| | | | | 297/180.14 |
| 2009/0033130 | A1* | 2/2009 | Marquette | B60N 2/5657 |
| | | | | 297/180.15 |
| 2016/0052362 | A1* | 2/2016 | Thomas | B60H 1/00478 |
| | | | | 62/3.3 |
| 2017/0008369 | A1* | 1/2017 | Kim | B60N 2/5628 |
| 2019/0061577 | A1* | 2/2019 | Dry | B60N 2/5635 |
| 2019/0331624 | A1* | 10/2019 | Singuru | G01N 27/048 |

FOREIGN PATENT DOCUMENTS

| | | |
|---|---|---|
| JP | 2008-529894 A | 8/2008 |
| JP | 201036637 A | 2/2010 |
| JP | 201643925 A | 4/2016 |
| JP | 2016145015 A | 8/2016 |
| JP | 2018118588 A | 8/2018 |
| WO | WO-2006117690 A2 | 11/2006 |

\* cited by examiner

SEAT AIR CONDITIONER

CROSS REFERENCE TO RELATED APPLICATION

The present application is a continuation application of International Patent Application No. PCT/JP2017/044463 filed on Dec. 12, 2017, which designated the U.S. and claims the benefit of priority from Japanese Patent Application No. 2017-24700 filed on Feb. 14, 2017. The entire disclosures of all of the above applications are incorporated herein by reference.

TECHNICAL FIELD

The present disclosure relates to a seat air conditioner that supplies conditioned air to a seat.

BACKGROUND ART

Various seat air conditioners have been developed in order to provide an occupant seated on a seat with a comfortable temperature environment.

SUMMARY

According to an aspect of the present disclosure, a seat air conditioner configured to supply conditioning air to a seat in a vehicle cabin, includes:

a refrigeration cycle including a compressor that compresses and discharges a refrigerant, a heat emitting portion that emits heat of the refrigerant discharged from the compressor to generate a warm air, a decompressor that decompresses the refrigerant flowing out of the heat emitting portion, and a heat absorbing portion that evaporates the refrigerant decompressed by the decompressor to generate a cold air;

an air blower that blows air to exchange heat with the refrigerant; and a conditioning air supply unit that supplies each of the warm air generated by the heat emitting portion and the cold air generated by the heat absorbing portion as the conditioning air to the seat.

DETAILED DESCRIPTION

Figure 1:
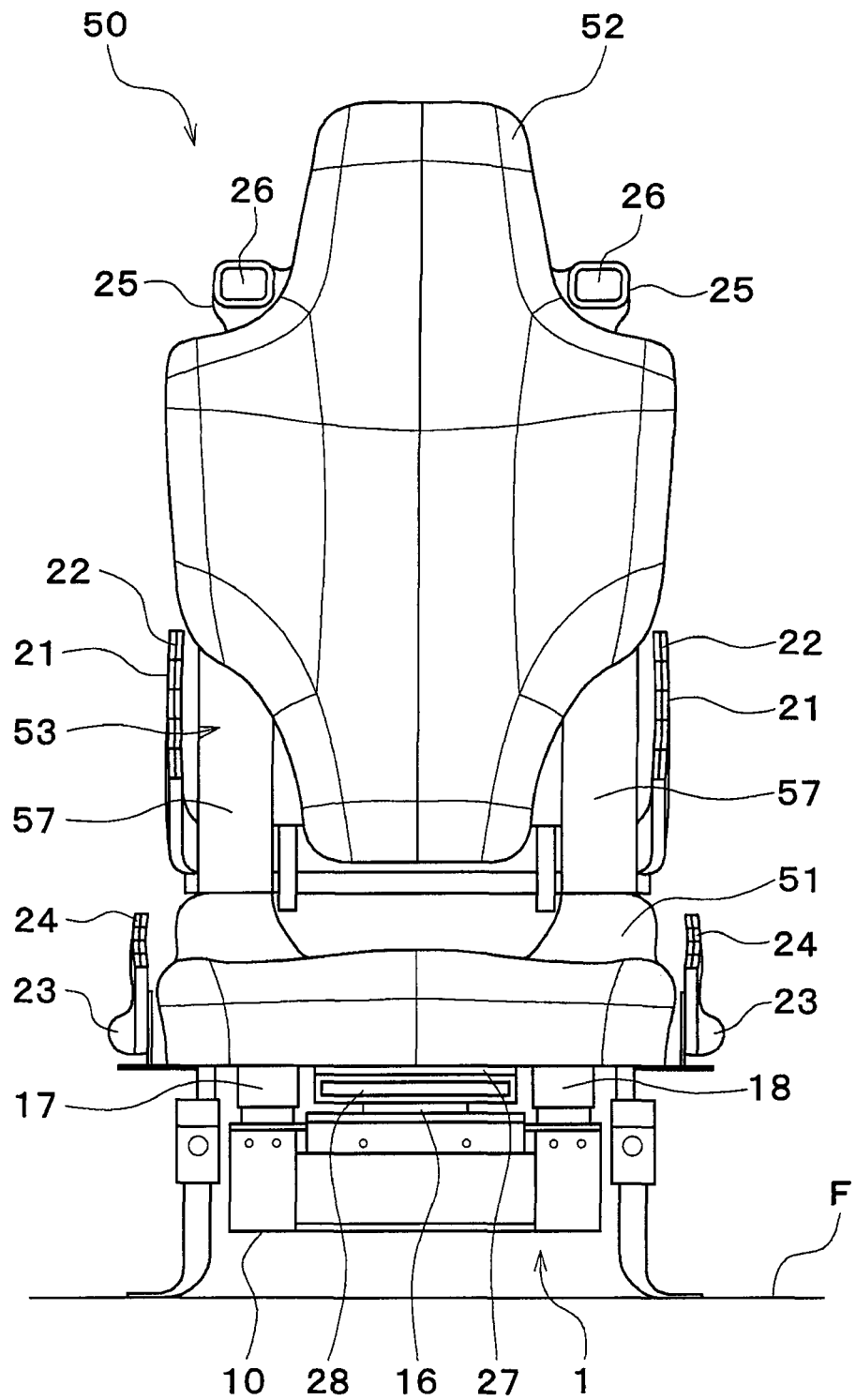
FIG. 1 is a front view of a seat air conditioner according to a first embodiment.

To begin with, examples of relevant techniques will be described.

A temperature control module having a Peltier element is disposed in a seat. Air subjected to temperature control by the temperature control module is blown for an occupant seated on the seat. The air is warmed or cooled by the Peltier effect when the air flows in the vicinity of the Peltier element on a path blown to the occupant.

When a direct current is supplied to the Peltier element, one surface of the Peltier element absorbs heat, and the other surface of the Peltier element emits heat. While one surface of the Peltier element is used to control the temperature of the air, the heat on the other surface is wasted.

For example, when air is cooled by the Peltier element, one surface of the Peltier element absorbs heat from the air to cool the air. The other surface of the Peltier element emits heat as the direct current flows at this time. However, the heat emitted by the Peltier element is wasted through air blown away from the occupant on the seat.

A seat air conditioner is disposed between a seating part of a seat and a floor, and includes a vapor compression refrigeration cycle inside a housing. The seat air conditioner supplies conditioned air with temperature controlled by the refrigeration cycle to the occupant seated on the seat. The conditioned air in this case is warmed or cooled by heat exchange in a condenser or an evaporator of the refrigeration cycle.

In the seat air conditioner, in the refrigeration cycle, gas phase refrigerant is compressed with a compressor to raise the temperature. The condenser condenses the refrigerant to liquid phase refrigerant to emit heat. The decompressor expands a part of the liquid refrigerant to evaporate. The remaining liquid refrigerant is evaporated by the evaporator to absorb heat from the surroundings. That is, the heat emission in the condenser and the heat absorption in the evaporator are simultaneously performed by the refrigeration cycle.

In the seat air conditioner, only one of the heat emission in the condenser or the heat absorption in the evaporator is used for controlling the temperature of air, and the other is wasted. In the seat air conditioner, for example, air from which heat is absorbed by the evaporator is supplied to the occupant, such that the cooling air is supplied to the occupant on the seat. At this time, heat emitted by the condenser is wasted through air blown away from the occupant on the seat.

The present disclosure provides a seat air conditioner capable of effectively utilizing heat generated by a heat absorbing portion and a heat emitting portion for a temperature control.

According to an aspect of the present disclosure, a seat air conditioner configured to supply conditioning air to a seat in a vehicle cabin, includes:

a refrigeration cycle including a compressor that compresses and discharges a refrigerant, a heat emitting portion that emits heat of the refrigerant discharged from the compressor to generate a warm air, a decompressor that decompresses the refrigerant flowing out of the heat emitting portion, and a heat absorbing portion that evaporates the refrigerant decompressed by the decompressor to generate a cold air;

an air blower that blows air to exchange heat with the refrigerant; and a conditioning air supply unit that supplies each of the warm air generated by the heat emitting portion and the cold air generated by the heat absorbing portion as the conditioning air to the seat.

Thus, the seat air conditioner produces the warm air and the cold air by exchanging heat with the refrigerant in the heat emitting portion and the heat absorbing portion of the refrigeration cycle, using the air blown by the air blower. Since the conditioning air supply unit of the seat air conditioner can supply the warm air generated by the heat emitting portion and the cold air generated by the heat absorbing portion as the conditioning air to the seat, the warm air and the cold air can be supplied for different purposes. That is, according to the seat air conditioner, both the warm air and the cold air, which are inevitably generated when the air conditioning is performed by the refrigeration cycle, can be effectively utilized without wasting one of the warm air and the cold air.

According to an aspect of the present disclosure, a seat air conditioner configured to supply conditioning air to a seat in a vehicle cabin, includes:

an air blower that blows air to be controlled in a temperature;

a thermoelectric element including a heat emitting portion that warms the air to generate a warm air by emitting heat upon energization, and a heat absorbing portion that cools the air to generate a cold air by absorbing heat upon the energization; and a conditioning air supply unit that supplies each of the warm air generated by the heat emitting portion and the cold air generated by the heat absorbing portion as the conditioning air to the seat.

Thus, the seat air conditioner produces the warm air and the cold air, using the air blown by the air blower, in the heat emitting portion and the heat absorbing portion as the thermoelectric element is energized. Since the conditioning air supply unit of the seat air conditioner can supply the warm air generated by the heat emitting portion and the cold air generated by the heat absorbing portion as the conditioning air to the seat, the warm air and the cold air can be supplied for different purposes. That is, according to the seat air conditioner, both the warm air and the cold air can be effectively utilized, without wasting one of the warm air and cold air which are produced when an air-conditioning is conducted using the thermoelectric element.

Hereinafter, embodiments will be described with reference to the drawings. In the following embodiments, identical or equivalent elements are denoted by the same reference numerals as each other in the figures.

First Embodiment

Figure 2:
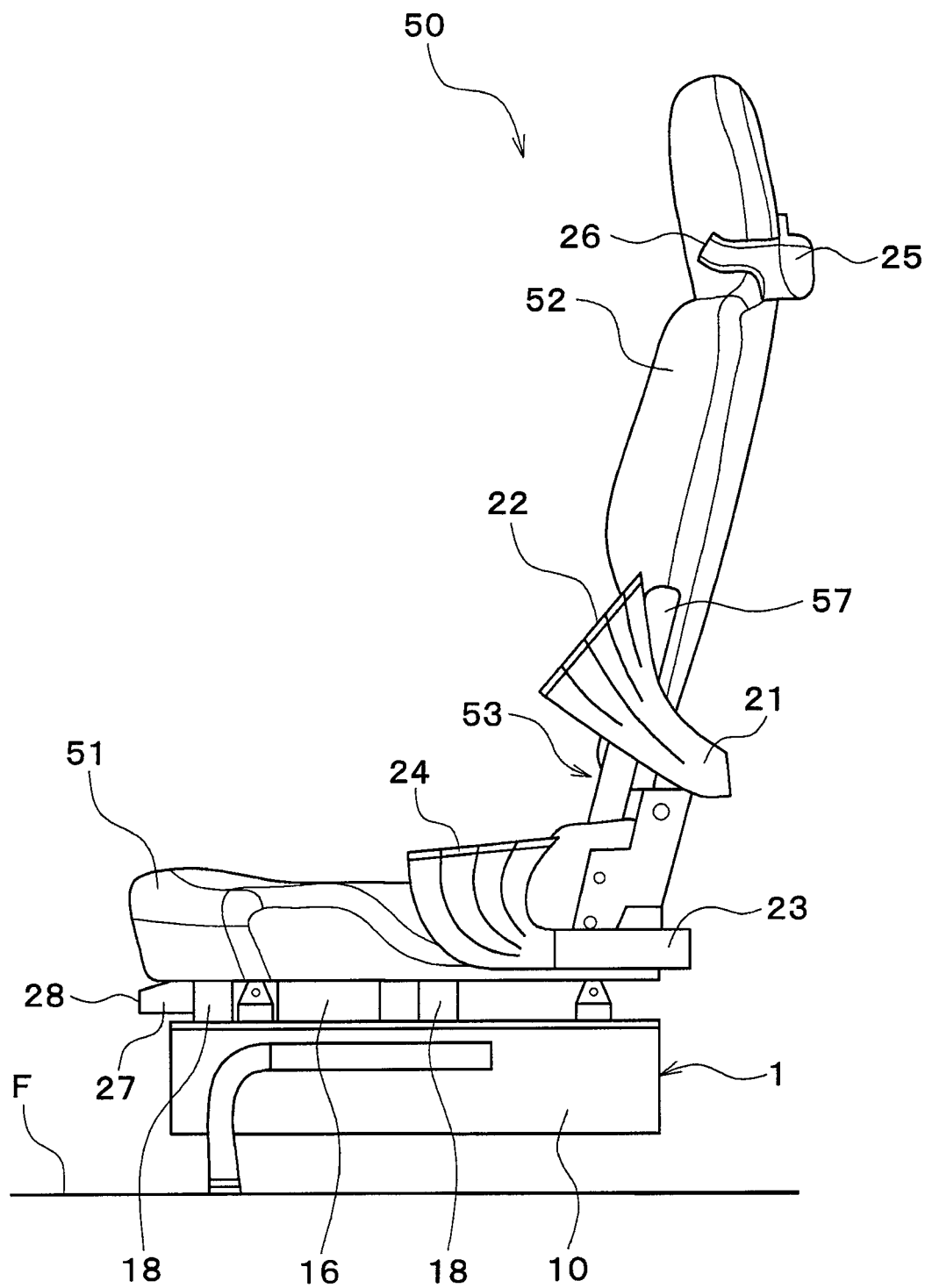
FIG. 2 is a side view of the seat air conditioner according to the first embodiment.

A seat air conditioner 1 according to the first embodiment is applied to an electric vehicle which travels by power of a battery. As shown in FIGS. 1 and 2, the seat air conditioner 1 is disposed in a small space between a seat portion 51 of a seat 50 of the electric vehicle and a cabin floor surface F of the vehicle and is adjusted to an appropriate temperature. By supplying the conditioned air, the comfort of the occupant sitting on the seat 50 is enhanced.

The seat air conditioner 1 includes a housing 10, and a vapor compression refrigeration cycle 2 and an air blower 7 which are housed in the housing 10. Therefore, the seat air conditioner 1 adjusts the temperature of the blown air by the operation of the air blower 7 by the refrigeration cycle 2 and supplies the conditioned air to the occupant seated on the seat 50 via the seat 50, the main duct 21 and the like.

The seat 50 includes the seat portion 51 and a backrest part 52. The seat 50 is disposed slidably in the front-rear direction of the vehicle with respect to the cabin floor surface F of the vehicle. The seat air conditioner 1 is fixed to the lower face of the seat portion 51 and slidable together with the seat 50. The seat air conditioner 1 receives power supplied from an onboard battery. A power line from the onboard battery includes coil wiring having an allowance so as to allow the seat 50 to slide.

A schematic configuration of the seat air conditioner 1 according to the first embodiment will be described in detail with reference to FIGS. 3 and 4. As described above, the seat air conditioner 1 according to the first embodiment is disposed between the seat portion 51 of the seat 50 and the cabin floor surface F.

Figure 3:
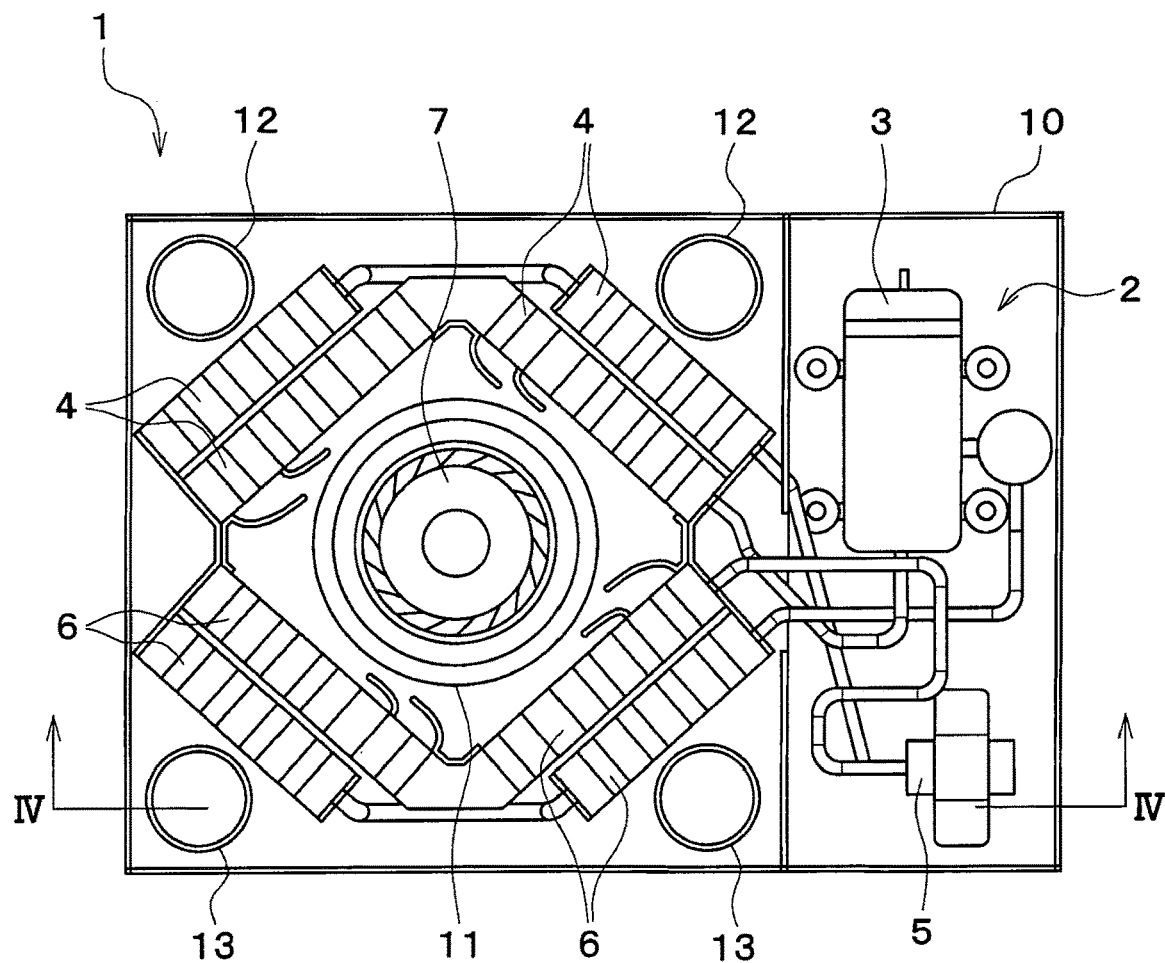
FIG. 3 is a plan view illustrating a schematic configuration of the seat air conditioner according to the first embodiment.
Figure 4:
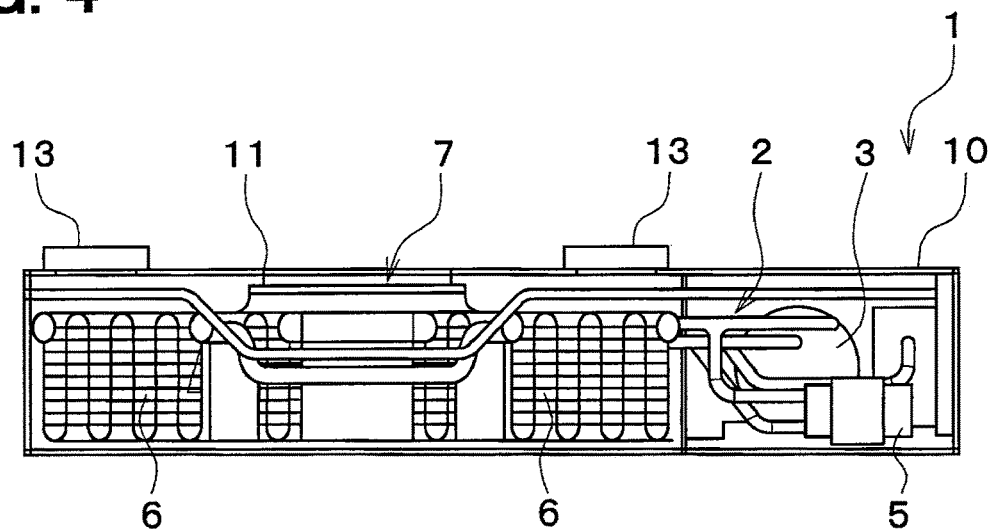
FIG. 4 is a sectional view taken along line IV-IV in FIG. 3.

As illustrated in FIGS. 3 and 4, in the seat air conditioner 1, the refrigeration cycle 2 and the air blower 7 are housed inside the housing 10 configured as a box which can be disposed between the seat portion 51 and the cabin floor surface F.

The refrigeration cycle 2 constitutes a vapor compression refrigeration cycle and has a function of cooling or heating ventilation air blown to an area around the seat 50 inside a cabin which is a space to be air-conditioned. The refrigeration cycle 2 includes a compressor 3, a condenser 4, an expansion valve 5, and an evaporator 6.

The refrigeration cycle 2 employs an HFC refrigerant (specifically, R134a) as a refrigerant and constitutes a vapor compression subcritical refrigeration cycle in which the high-pressure side refrigerant pressure does not exceed the critical pressure of the refrigerant. An HFO refrigerant (e.g., R1234yf) or a natural refrigerant (e.g., R744) may be employed as the refrigerant. A refrigerating machine oil for lubricating the compressor 3 is mixed in the refrigerant. Part of the refrigerating machine oil circulates through the cycle together with the refrigerant.

As illustrated in FIG. 3, in the seat air conditioner 1, the air blower 7 is disposed at the central part inside the housing 10. The air blower 7 is an electric air blower which drives a centrifugal multi-blade fan by an electric motor. The air blower 7 is disposed with a rotation axis of the centrifugal multi-blade fan aligned with the up-down direction of the housing 10. Thus, the air blower 7 draws air along the up-down direction of the housing 10 and blows the drawn air in the direction perpendicular to the axis and in the centrifugal direction. The rotational speed (air flow rate) of the centrifugal multi-blade fan in the air blower 7 is controlled by a control voltage output from an air conditioning controller 40 described later.

The compressor 3 sucks, compresses, and discharges the refrigerant in the refrigeration cycle 2. The compressor 3 is disposed inside the housing 10 of the seat air conditioner 1. The compressor 3 is configured as an electric compressor which drives a fixed displacement compression mechanism whose discharge capacity is fixed by an electric motor. Various compression mechanisms such as a scroll compression mechanism and a vane compression mechanism can be employed as the compression mechanism.

The operation (number of revolutions) of the electric motor of the compressor 3 is controlled by a control signal outputted from the air conditioning controller 40 to be described later. Any of an AC motor and a DC motor may be employed as the electric motor. A refrigerant discharge capacity of the compression mechanism is changed by controlling the rotation speed of the electric motor by the air conditioning controller 40.

A refrigerant inlet side of the condenser 4 is connected to a discharge port of the compressor 3. As illustrated in FIG. 3, the condenser 4 includes plural heat exchangers which are disposed in a manner to surround the air blower 7 over the range of approximately 180 degrees and connected through refrigerant pipes. Thus, the condenser 4 is capable of exchanging heat between the high-temperature and high-pressure refrigerant discharged from the compressor 3 and air blown by the air blower 7 to heat the air. That is, the condenser 4 operates as a heat exchanger for heating, and functions as a heat emitting portion.

The expansion valve 5 is disposed on a refrigerant outlet side of the condenser 4. The expansion valve 5 is capable of changing a throttle opening degree of a refrigerant passage, and decompresses the refrigerant flowing out of the condenser 4. The expansion valve 5 functions as a decompressor.

The expansion valve 5 is used as the decompressor according to the first embodiment. However, the present disclosure is not limited to this mode. Various configurations capable of decompressing the refrigerant flowing out of the condenser 4 can be employed as the decompressor. For example, a fixed throttle or a capillary tube may be employed as the decompressor, or an expansion valve capable of controlling a throttle opening degree by a control signal of the air conditioning controller 40 may be used.

A refrigerant inlet side of the evaporator 6 is connected to an outlet side of the expansion valve 5. As illustrated in FIG. 3, the evaporator 6 includes plural heat exchangers which are disposed in a manner to surround the air blower 7 over the range of approximately 180 degrees and connected through refrigerant pipes. That is, as shown in FIG. 3, the air blower 7 is surrounded by the condenser 4 and the evaporator 6. The evaporator 6 is capable of exchanging heat between the refrigerant flowing out of the expansion valve 5 and air blown by the air blower 7 to cool the air. That is, the evaporator 6 operates as a heat exchanger for cooling and functions as a heat absorbing portion.

The housing 10 is formed in a box shape of a size that can be disposed in the space between the seat portion 51 of the seat 50 and the cabin floor surface F. The housing 10 has an air inlet 11, plural warm air outlets 12, and plural cold air outlets 13 on the upper surface thereof.

As shown in FIGS. 3 and 4, the air inlet 11 is formed at a central portion of the top surface of the housing 10. The air inlet 11 is opened so as to include a portion immediately above the rotation shaft of the centrifugal multi-blade fan in the air blower 7. The inside and the outside of the housing 10 are communicated with each other by the air inlet 11. Therefore, the air blower 7 can suck the air from the vehicle cabin into the housing 10 through the air inlet 11 in accordance with the operation of the air blower 7.

The warm air outlets 12 are open at two corners of the upper face of the housing 10, the two corners being located adjacent to the condenser 4, and allow the inside and the outside of the housing 10 to communicate with each other. A part of the air blown by the air blower 7 is warmed by heat exchange in the condenser 4 and then blown out from the warm air outlets 12.

The cold air outlets 13 are open at two corners of the upper face of the housing 10, the two corners being located adjacent to the evaporator 6, and allow the inside and the outside of the housing 10 to communicate with each other. The rest part of the air blown by the air blower 7 is cooled by heat exchange in the evaporator 6 and then blown out through the cold air outlets 13.

As shown in FIG. 1 and FIG. 2, a central connection member 16 is attached to the air inlet 11. The central connection member 16 is formed in a hollow shape and connected to the lower face of the seat portion 51 of the seat 50.

The seat portion 51 of the seat 50 includes a cushion which is made of a porous material such as urethane on the upper part thereof. The elasticity of the cushion relieves a shock generated by contact with the occupant. The seat portion 51 has air permeability due to the cushion made of the porous material.

Thus, the seat air conditioner 1 is capable of moving air between the seat air conditioner 1 and a space above the seat portion 51 having air permeability through the air inlet 11 and the central connection member 16 and capable of drawing air from the space above the seat portion 51. That is, the central connection member 16 is an example of a connection member.

A warm air side connection member 17 having a hollow shape is attached to the warm air outlet 12, and a cold air side connection member 18 having a hollow shape is attached to the cold air outlet 13. Each of the warm air side connection member 17 and the cold air side connection member 18 is connected to a conditioning air supply unit 30 described later, and is connected to an end of a main duct 21 and/or a seat frame 53 through the conditioning air supply unit 30.

Figure 9:
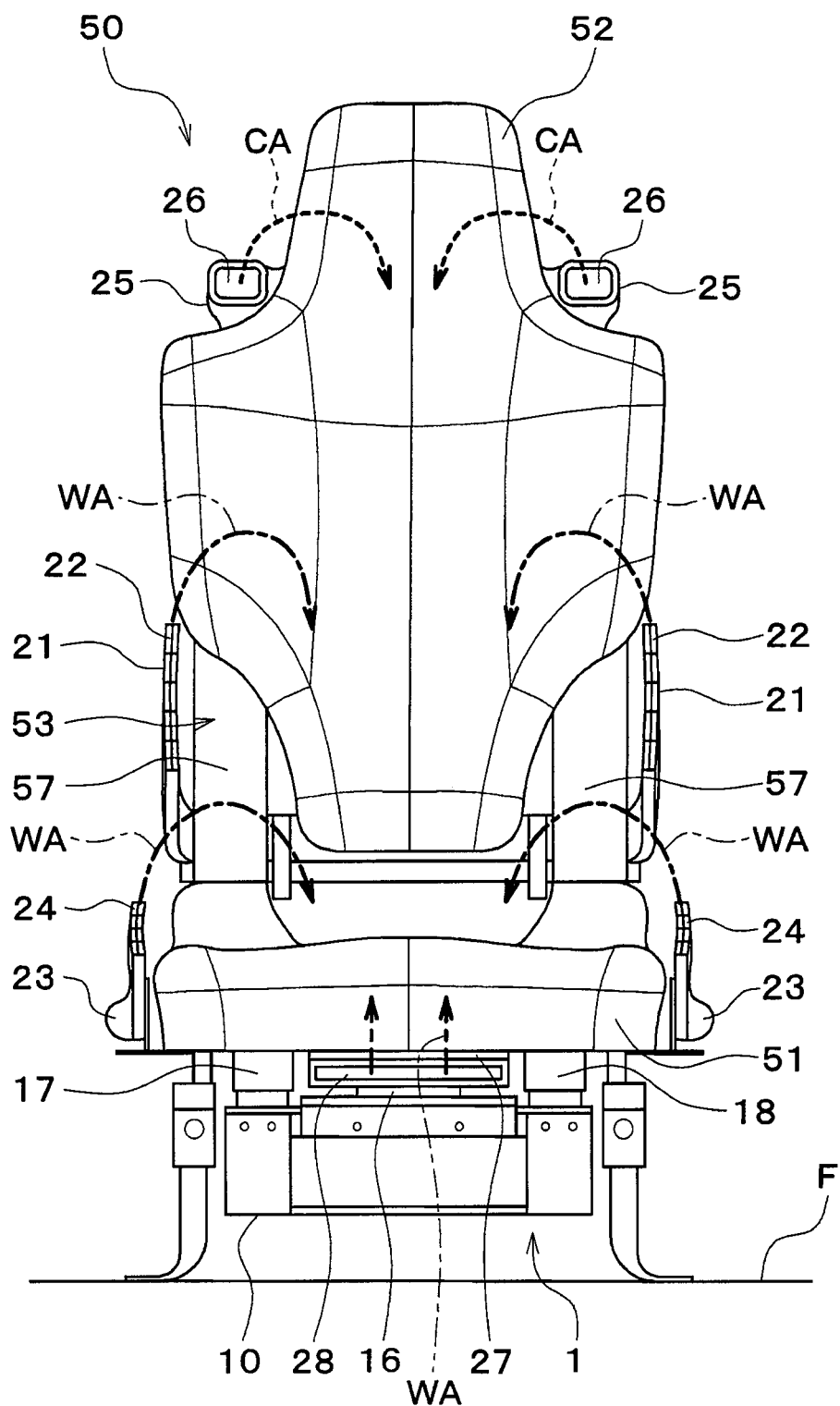
FIG. 9 is a front view illustrating flows of warm air and cold air in the first supply mode.

Accordingly, as shown in FIG. 9, the seat air conditioner 1 according to the first embodiment can supply air conditioned by the refrigeration cycle 2 to the occupant seated on the seat 50 via various ducts such as the main duct 21 and a second seat frame 57 described later.

As shown in FIGS. 1 and 2, the main duct 21, the leg duct 23, and the upper duct 25 are disposed on both sides of the seat 50. Further, the lower duct 27 is disposed below the seat portion 51 of the seat 50.

The main duct 21 is formed in a flat hollow shape, and extends from the conditioning air supply unit 30 disposed inside the seat portion 51 of the seat 50 to the middle of the backrest part 52 along the side surface of the seat 50.

One end of the main duct 21 is located at the middle of the backrest part 52, and includes a main outlet 22. The main outlet 22 communicates with the inside of the main duct 21 and is formed to be slightly curved inward in the width direction of the seat 50. The other end of the main duct 21 is connected to the warm air side connection member 17, the warm air outlet 12, the cold air side connection member 18, and the cold air outlet 13 via the conditioning air supply unit 30.

Therefore, the warm air WA or the cold air CA as the conditioned air adjusted by the seat air conditioner 1 is supplied to the occupant on the seat 50 through the main outlet 22. Since the main outlet 22 is slightly curved inward in the width direction on the middle of the backrest part 52, the seat air conditioner 1 is capable of more efficiently supplying conditioned air to the trunk part of the occupant seated on the seat 50. Therefore, the main duct 21 constitutes a part of the conditioning air supply unit, and the main outlet 22 constitutes a part of the intermediate outlet.

The leg duct 23 is hollow and extended upward along the seat portion 51 of the seat 50 and then bent upward. One end of the leg duct 23 is located slightly above the upper face of the seat portion 51, and includes a leg outlet 24. The leg outlet 24 is formed to be slightly curved inward in the vehicle width direction. The other end of the leg duct 23 is connected to the warm air side connection member 17, the warm air outlet 12, the cold air side connection member 18 and the cold air outlet 13 via the conditioning air supply unit 30.

Therefore, the warm air WA or the cold air CA adjusted by the seat air conditioner 1 is supplied to the legs of the occupant on the seat 50 through the leg outlet 24. Since the leg outlet 24 is slightly curved inward in the width direction at the position above the upper face of the seat portion 51, the seat air conditioner 1 is capable of more efficiently supplying conditioned air to the leg such as thigh of the occupant seated on the seat 50. Accordingly, the leg duct 23 constitutes a part of the conditioning air supply part, and the leg outlet 24 constitutes a part of the intermediate outlet.

The upper duct 25 is formed in a hollow shape extending upward along the backrest part 52, and is bent forward on the top of the backrest part 52. One end of the upper duct 25 is located at the upper part of the backrest part 52, and has an upper outlet 26 opened forward. The other end of the upper duct 25 is connected to the warm air side connection member 17, the warm air outlet 12, the cold air side connection member 18, and the cold air outlet 13 via the conditioning air supply unit 30.

Therefore, the warm air WA or the cold air CA adjusted by the seat air conditioner 1 is supplied toward the head of the occupant on the seat 50 through the upper outlet 26. That is, the upper duct 25 constitutes a part of the conditioning air supply unit, and the upper outlet 26 functions as the upper outlet.

A lower duct 27 having a hollow shape is disposed on the front side of the seat portion 51 of the seat 50 and is connected to the conditioning air supply unit 30. The lower duct 27 is, as shown in FIG. 1 and FIG. 2, located at the center in the width direction of the seat portion 51 and disposed between the warm air side connection member 17 and the cold air side connection member 18 located on the front side.

A lower outlet 28 is formed on the front surface of the lower duct 27 to make the inside and the outside of the lower duct 27 to communicate with each other. The other end of the lower duct 27 is connected to the warm air side connection member 17, the warm air outlet 12, the cold air side connection member 18, and the cold air outlet 13 through the conditioning air supply unit 30 as in the main duct 21.

Therefore, the warm air WA or the cold air CA adjusted by the seat air conditioner 1 is supplied toward the foot of the occupant on the seat 50 through the lower outlet 28. That is, the lower duct 27 constitutes a part of the conditioning air supply unit, and the lower outlet 28 functions as the lower outlet.

Next, the configuration of the seat 50 will be described in detail with reference to the drawings. The seat 50 is disposed for an occupant in the electric vehicle. The seat 50 includes the seat portion 51, the backrest part 52, and the seat frame 53. The occupant is seated on the seat portion 51 including a porous cushion on the upper face thereof.

The backrest part 52 supports the occupant seated on the seat portion 51 from the back, and includes a porous cushion on the front face thereof. The seat 50 is configured in such a manner that the relative position between the seat portion 51 and the backrest part 52 is fixed by the seat frame 53.

Figure 5:
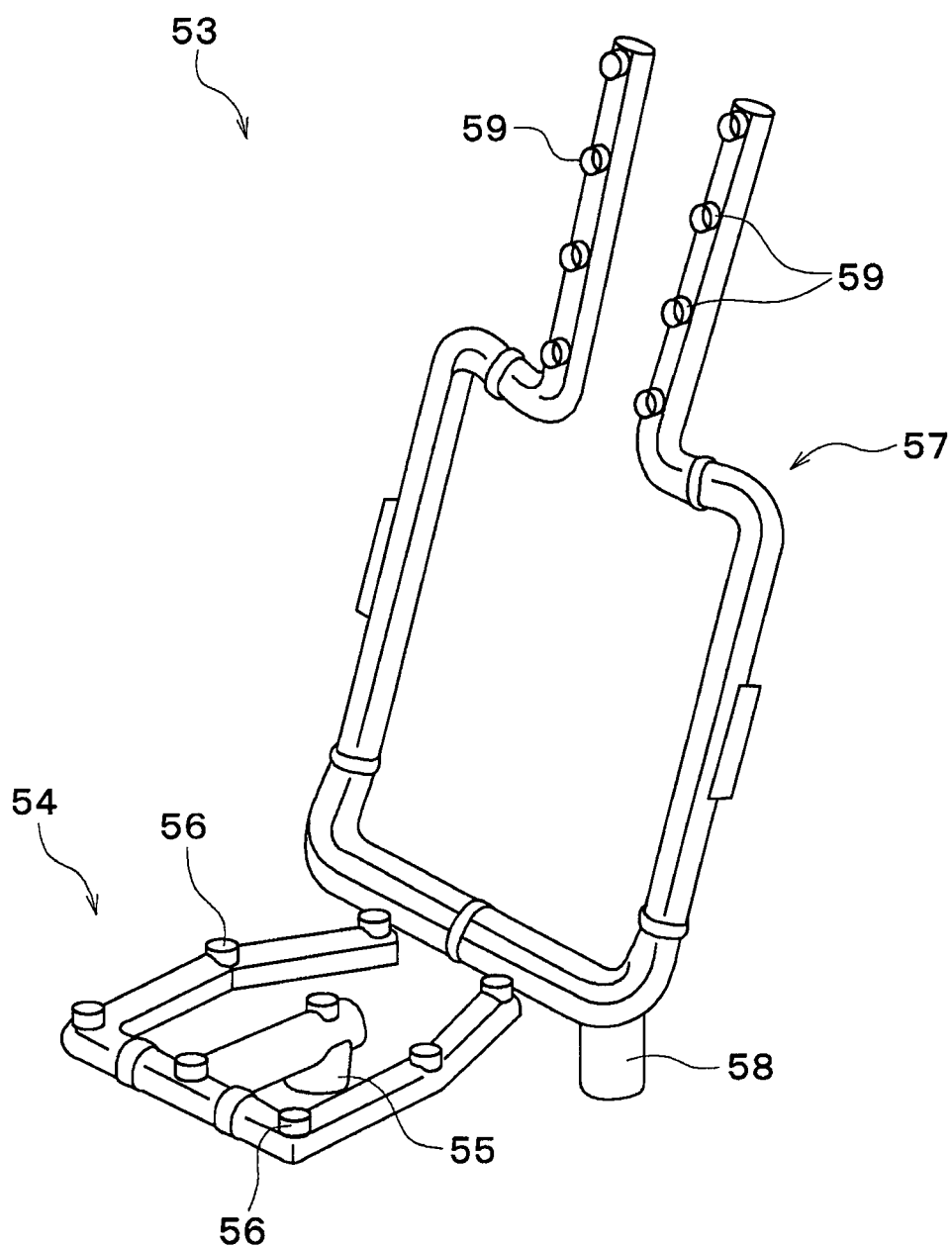
FIG. 5 is a perspective view illustrating a seat frame of a seat.

The seat frame 53 includes metal pipes combined with each other. The seat frame 53 functions as a skeleton material part of the seat 50 and, at the same time, functions as a flow passage for air in the seat air conditioner 1. As illustrated in FIG. 5, the seat frame 53 includes the first seat frame 54 and the second seat frame 57. The first seat frame 54 and the second seat frame 57 are coupled together through a reinforcing member (not illustrated), and the relative positional relationship between the first seat frame 54 and the second seat frame 57 is maintained.

The first seat frame 54 is disposed inside the seat portion 51 below the cushion of the seat portion 51. The first seat frame 54 includes a connector 55 and plural vent holes 56. The connector 55 is formed on the end of the first seat frame 54, and projects from the lower face of the seat portion 51. The end of the central connection member 16 is connected to the connector 55.

The vent holes 56 are disposed at plural positions on the upper face of the first seat frame 54 and communicate with the inside of the first seat frame 54 having a hollow shape. Thus, the seat air conditioner 1 according to the first embodiment is capable of drawing air above the seat portion 51 into the housing 10 through the cushion of the seat portion 51, the first seat frame 54, the central connection member 16, and the air inlet 11.

The second seat frame 57 is disposed inside the backrest part 52 behind the cushion of the backrest part 52, and includes a conditioned air supply port 58 and plural conditioned air blowoff ports 59. The conditioned air supply port 58 is disposed at the lower end of the backrest part 52, and is connected to the warm air side connection member 17, the warm air outlet 12, the cold air side connection member 18, and the cold air outlet 13 via the conditioning air supply unit 30.

As illustrated in FIG. 5, the conditioned air blowoff ports 59 are disposed at plural positions on the front side of the second seat frame 57, and communicate with the inside of the second seat frame 57 having a hollow shape. Therefore, the seat air conditioner 1 according to the first embodiment can supply the conditioned air such as the warm air WA blown out through the warm air outlet 12 or the cold air CA blown out through the cold air outlet 13, through the conditioning air supply unit 30, the second seat frame 57 and the cushion of the backrest part 52 into the vehicle cabin.

Since the cushions of the seat portion 51 and the backrest part 52 are porous, it is possible to control the temperature of the cushions of the seat portion 51 and the backrest part 52 by an air flow created by the seat air conditioner 1.

A control system that controls the operation of the seat air conditioner 1 will be described with reference to FIG. 6. The seat air conditioner 1 has the air conditioning controller 40 for controlling the components of the seat air conditioner 1. The air conditioning controller 40 includes a known microcomputer including CPU, ROM, RAM and the like, and peripheral circuits. The air conditioning controller 40 performs various calculations and processes based on the control program stored in the ROM, and controls the components of the air conditioner such as the compressor 3, the air blower 7, and the conditioning air supply unit 30. That is, the air conditioning controller 40 functions as a controller.

Figure 6:
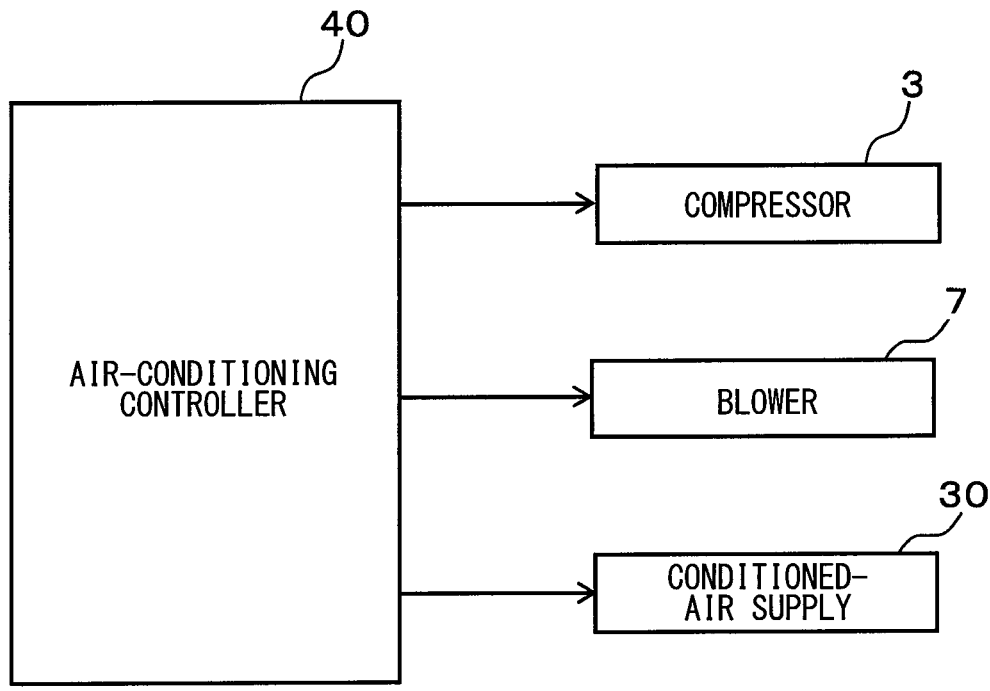
FIG. 6 is a block diagram illustrating a control system of the seat air conditioner according to the first embodiment.

As shown in FIG. 6, the compressor 3, the air blower 7, and the conditioning air supply unit 30 are connected to the output side of the air conditioning controller 40. Therefore, the air conditioning controller 40 can adjust the refrigerant discharge performance (for example, the refrigerant pressure) by the compressor 3 and the air flow performance (for example, the air flow rate) by the air blower 7 according to the situation.

As described above, the warm air outlet 12 and the cold air outlet 13 are connected to the conditioning air supply unit 30. Further, the main duct 21, the leg duct 23, the upper duct 25, the lower duct 27, and the second seat frame 57 are connected to the conditioning air supply unit 30.

The conditioning air supply unit 30 includes plural upstream passages, plural downstream passages, and plural passage switching mechanisms. The upstream passages include an upstream channel connected to the warm air outlet 12 and an upstream channel connected to the cold air outlet 13.

The plural downstream passages include a downstream channel connected to the main duct 21, a downstream channel connected to the leg duct 23, a downstream channel connected to the upper duct 25, a downstream channel connected to the lower duct 27, and a downstream channel connected to the second seat frame 57.

The passage switching mechanism is disposed at the respective connection between the upstream channel and the downstream channel. The passage switching mechanism includes a door member to open and close, and an electromagnetic motor for driving the door member. It is possible to switch the flow of the conditioned air at the downstream of the connection, by controlling the passage switching mechanism.

The air conditioning controller 40 can control the passage switching mechanisms in the conditioning air supply unit 30. That is, the air conditioning controller 40 appropriately controls the supply of the conditioning air blown out from the main duct 21, the leg duct 23, the upper duct 25, the lower duct 27, and the second seat frame 57 by controlling the conditioning air supply unit 30.

In FIG. 6, although only the structure connected to the output side of the air conditioning controller 40 is shown, it is not limited to this. For example, sensors for controlling the air-conditioning such as an inside air temperature sensor or/and an outside air temperature sensor may be connected to the input side of the air conditioning controller 40, or an operation panel for instructing operation of the seat air conditioner 1 may be connected to the input side of the air conditioning controller 40.

Furthermore, the arrangement location of the air conditioning controller 40 is not limited while the air conditioning controller 40 is disposed in the electric vehicle equipped with the seat air conditioner 1. For example, the air conditioning controller 40 may be disposed inside the housing 10 of the seat air conditioner 1 or may be disposed in the vicinity of an instrument panel at the front of the cabin of an electric vehicle.

Next, the supply mode of the warm air WA and the cold air CA by the conditioning air supply unit 30 in the seat air conditioner 1 will be described with reference to FIG. 7 and FIG. 8. As described above, according to the seat air conditioner 1, the conditioned air blown out from the main duct 21, the leg duct 23, the upper duct 25, the lower duct 27, and the second seat frame 57 can be switched to the warm air WA or the cold air CA by controlling the conditioning air supply unit 30.

Figure 7:
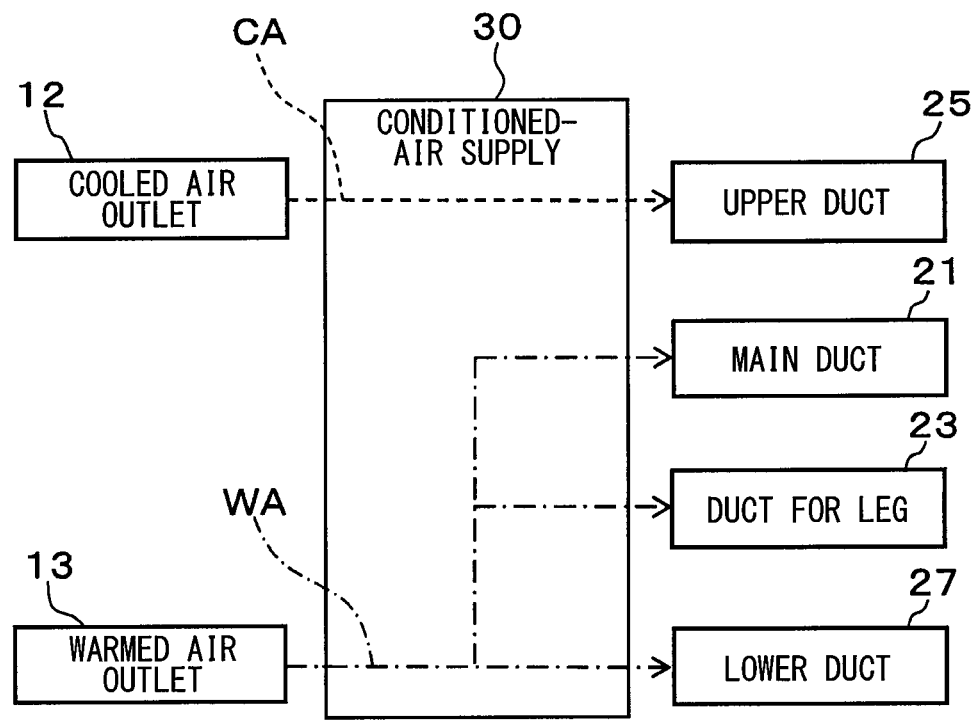
FIG. 7 is an explanatory view illustrating a first supply mode by a conditioning air supply unit.
Figure 8:
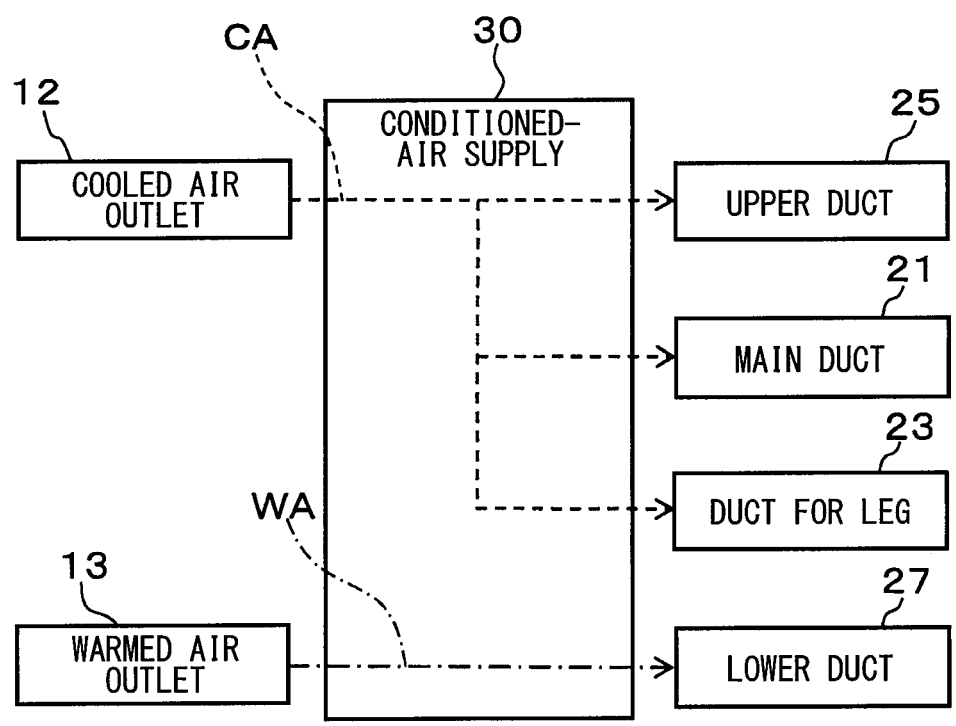
FIG. 8 is an explanatory view illustrating a second supply mode by the conditioning air supply unit.

Specifically, the supply mode of the conditioned air to the seat 50 can be set between a first supply mode shown in FIG. 7 and a second supply mode shown in FIG. 8 by controlling the conditioning air supply unit 30 of the seat air conditioner 1.

The supply mode of the conditioning air in the seat air conditioner 1 is switched according to various opportunity. For example, the supply mode of the conditioning air may be switched according to an operation of the operation panel input by the occupant. It is also possible to switch according to the environmental conditions such as temperature outside the vehicle (that is, the outside temperature), or temperature inside the vehicle (inside temperature).

In the first supply mode, the air conditioning controller 40 controls the conditioning air supply unit 30 so that the upstream channel on the warm air outlet 12 is connected to the leg duct 23, the upper duct 25, and the lower duct 27 on the downstream side. At the same time, the air conditioning controller 40 controls the conditioning air supply unit 30 so that the upstream channel on the cold air outlet 13 is connected to the main duct 21 on the downstream side. As shown in FIG. 7, in the first supply mode, the cold air CA supplied from the cold air outlet 13 is blown out from the upper outlet 26 of the upper duct 25. The warm air WA supplied from the warm air outlet 12 is blown out from the main outlet 22 of the main duct 21, the leg outlet 24 of the leg duct 23, and the lower outlet 28 of the lower duct 27.

In the second supply mode, the air conditioning controller 40 controls the conditioning air supply unit 30 to connect the lower duct 27 to the warm air outlet 12. At the same time, the air conditioning controller 40 connects the main duct 21, the leg duct 23 and the upper duct 25 to the cold air outlet 13.

In the second supply mode, as shown in FIG. 8, the cold air CA supplied from the cold air outlet 13 is blown out from the upper outlet 26 of the upper duct 25, the main outlet 22 of the main duct 21, and the leg outlet 24 of the leg duct 23. The warm air WA supplied from the warm air outlet 12 is blown out from the lower outlet 28 of the lower duct 27.

Subsequently, the operation mode of each component and the flow of air will be described with reference to FIGS. 9 and 10 when the seat air conditioner 1 operates in the first supply mode. The seat air conditioner 1 according to the first embodiment starts the operation of the compressor 3 and the air blower 7 when the air conditioning of the seat 50 is started.

When the operation of the air blower 7 is started, the air above the seat portion 51 is sucked into the housing 10 from the air inlet 11 through the cushion of the seat portion 51, the first seat frame 54, and the central connection member 16. The air sucked into the housing 10 is blown to the condenser 4 and the evaporator 6 disposed around the air blower 7.

When the operation of the compressor 3 is started, the compressor 3 compresses the refrigerant and discharges the refrigerant as a high-temperature high-pressure gas refrigerant. The condenser 4 is connected to the discharge port of the compressor 3.

The condenser 4 cools and condenses the gas refrigerant discharged from the compressor 3 by heat exchange with the air blown by the air blower 7. In other words, the condenser 4 produces the warm air WA by heating the air using the heat of the gas refrigerant.

The condensed refrigerant flows into the expansion valve 5 from the outlet of the condenser 4. The expansion valve 5 decompresses and expands the liquid refrigerant into a gas-liquid two-phase state. Then, the evaporator 6 absorbs heat from the air passing through the evaporator 6 by evaporating the refrigerant that has passed through the expansion valve 5. That is, the evaporator 6 produces the cold air CA by absorbing the heat of the air by the refrigerant to cool the air.

According to the first embodiment, the seat air conditioner 1 simultaneously generates the warm air WA and the cold air CA by the refrigeration cycle 2. The warm air WA generated by the condenser 4 is introduced from the warm air outlet 12 into the conditioning air supply unit 30 via the warm air side connection member 17. The cold air CA generated by the evaporator 6 is introduced into the conditioning air supply unit 30 via the cold air side connection member 18.

As shown in FIG. 7, in the first supply mode, the warm air outlet 12 is connected to the main duct 21, the leg duct 23, and the lower duct 27 by controlling the conditioning air supply unit 30. The cold air outlet 13 is connected to the upper duct 25 by controlling the conditioning air supply unit 30.

Figure 10:
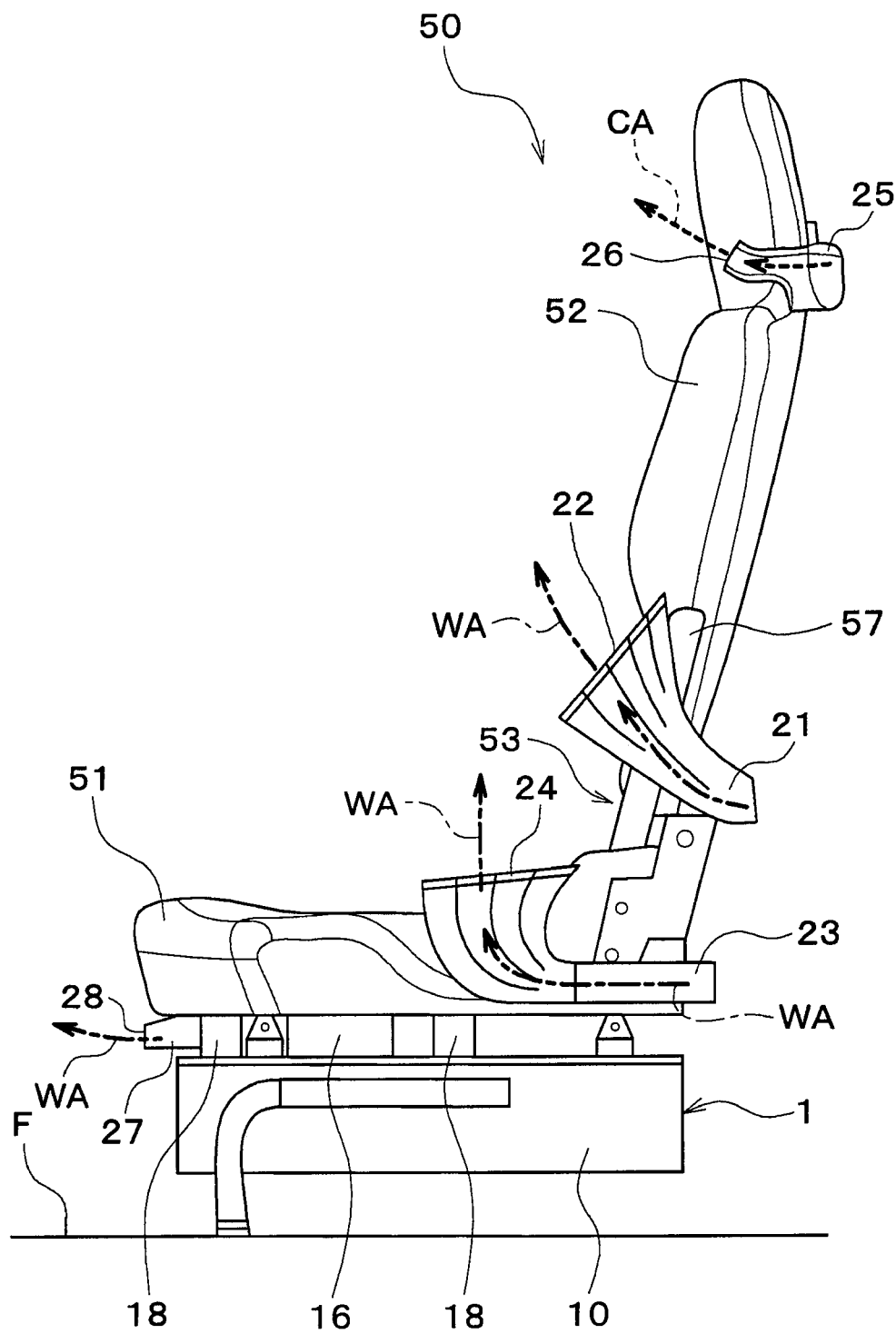
FIG. 10 is a side view illustrating flows of warm air and cold air in the first supply mode.

As shown in FIGS. 9 and 10, in the first supply mode, the warm air WA having flowed through the main duct 21 is blown forward and obliquely upward from the main outlets 22 located on the left and right sides of the backrest part 52. The main outlets 22 are bent inward in the width direction of the seat 50 on both right and left sides of the backrest part 52. Therefore, the warm air WA is blown out toward the trunk of the occupant on the seat 50.

The warm air WA having flowed through the leg duct 23 is blown upward from the leg outlets 24 located on the left and right sides of the seat portion 51. The leg outlets 24 are bent inward in the width direction of the seat 50 on both right and left sides of the seat portion 51. Therefore, the warm air WA is blown out toward the leg or the like of the occupant on the seat 50.

The warm air WA having flowed through the lower duct 27 is blown forward from the lower outlet 28 located at the lower front side of the seat portion 51. The knee to the toe of the occupant on the seat 50 is located on the lower front side of the seat portion 51. Therefore, the warm air WA is blown toward the feet of the occupant on the seat 50.

The cold air CA having flowed through the upper duct 25 is blown forward from the upper outlets 26 located on the left and right sides of the upper portion (for example, the headrest portion) of the backrest part 52. The head of the occupant on the seat 50 is located near the top of the backrest part 52. Therefore, the cold air CA is blown toward the head of the occupant on the seat 50.

As shown in FIGS. 9 and 10, in the first supply mode, the seat air conditioner 1 supplies the warm air WA to warm the lower body of the occupant on the seat 50, and supplies the cold air CA to place the head of the occupant in a low temperature environment. That is, the seat air conditioner 1 can effectively use the warm air WA and the cold air CA generated by the refrigeration cycle 2 to put the occupant on the seat 50 in a state so-called head-cooled and foot-warmed.

In the case of a low temperature environment such as winter, it is important to warm the occupant to improve the occupants' comfort. However, if the entire body of the occupant is in an excessively warm environment, the occupant's head may be too hot, and the occupant's brain function may be lowered. If the brain function of the occupant driving the electric car is reduced by heating the head too much, the concentration ability may be reduced or the occupant's operation for avoiding a danger may be slowed down.

In this respect, in the first supply mode, the cold air CA from the upper duct 25 prevents the occupant's head from being heated too much while the warm air WA from the main duct 21 can heat the lower body of the occupant. That is, the seat air conditioner 1 can improve the comfort of the occupant, by operating in the first supply mode, in winter and at the same time, can suppress the decrease in the brain function of the occupant to ensure the safety.

Moreover, the seat air conditioner 1 utilizes both the warm air WA and the cold air CA effectively, without exhausting one of the warm air WA and the cold air CA which are produced by the refrigeration cycle 2, to create so-called head-cooled and foot-warmed condition. That is, by operating in the first supply mode, the seat air conditioner 1 can contribute to energy saving while enhancing the comfort of the occupant.

Next, the operation mode of each configuration and the flow of air will be described with reference to FIGS. 11 and 12 when the seat air conditioner 1 operates in the second supply mode. The operations of the refrigeration cycle 2 and the air blower 7 in this case are the same as those in the first supply mode.

Therefore, the redundant explanation is omitted on this point.

In the seat air conditioner 1, the warm air WA and the cold air CA are simultaneously generated by the refrigeration cycle 2. The warm air WA generated by the condenser 4 is introduced from the warm air outlet 12 into the conditioning air supply unit 30 via the warm air side connection member 17. The cold air CA generated by the evaporator 6 is introduced into the conditioning air supply unit 30 via the cold air side connection member 18.

As shown in FIG. 8, in the second supply mode, the warm air outlet 12 is connected to the lower duct 27 by the conditioning air supply unit 30. The cold air outlet 13 is connected to the main duct 21, the leg duct 23, and the upper duct 25 by the conditioning air supply unit 30.

Figure 11:
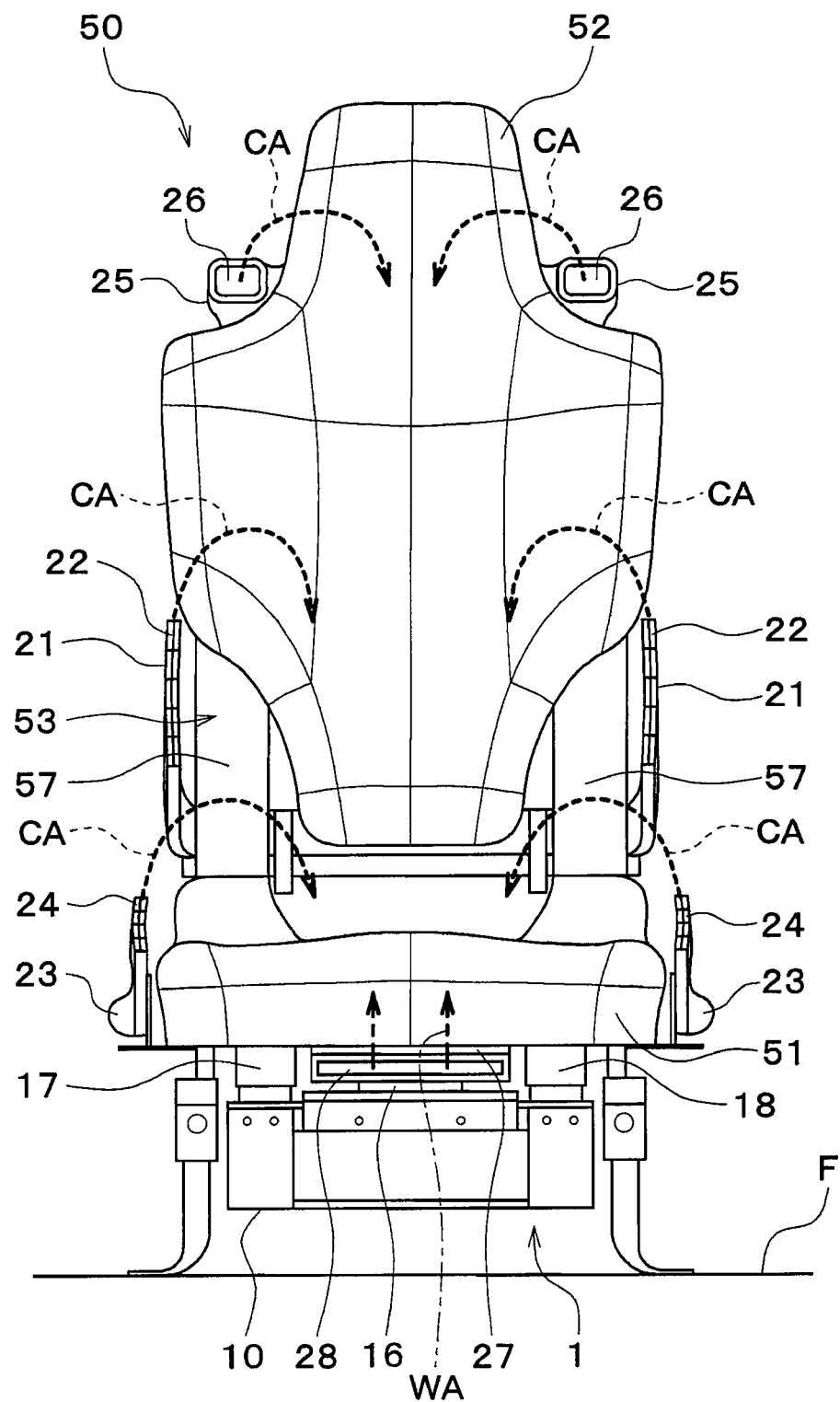
FIG. 11 is a front view illustrating flows of warm air and cold air in the second supply mode.
Figure 12:
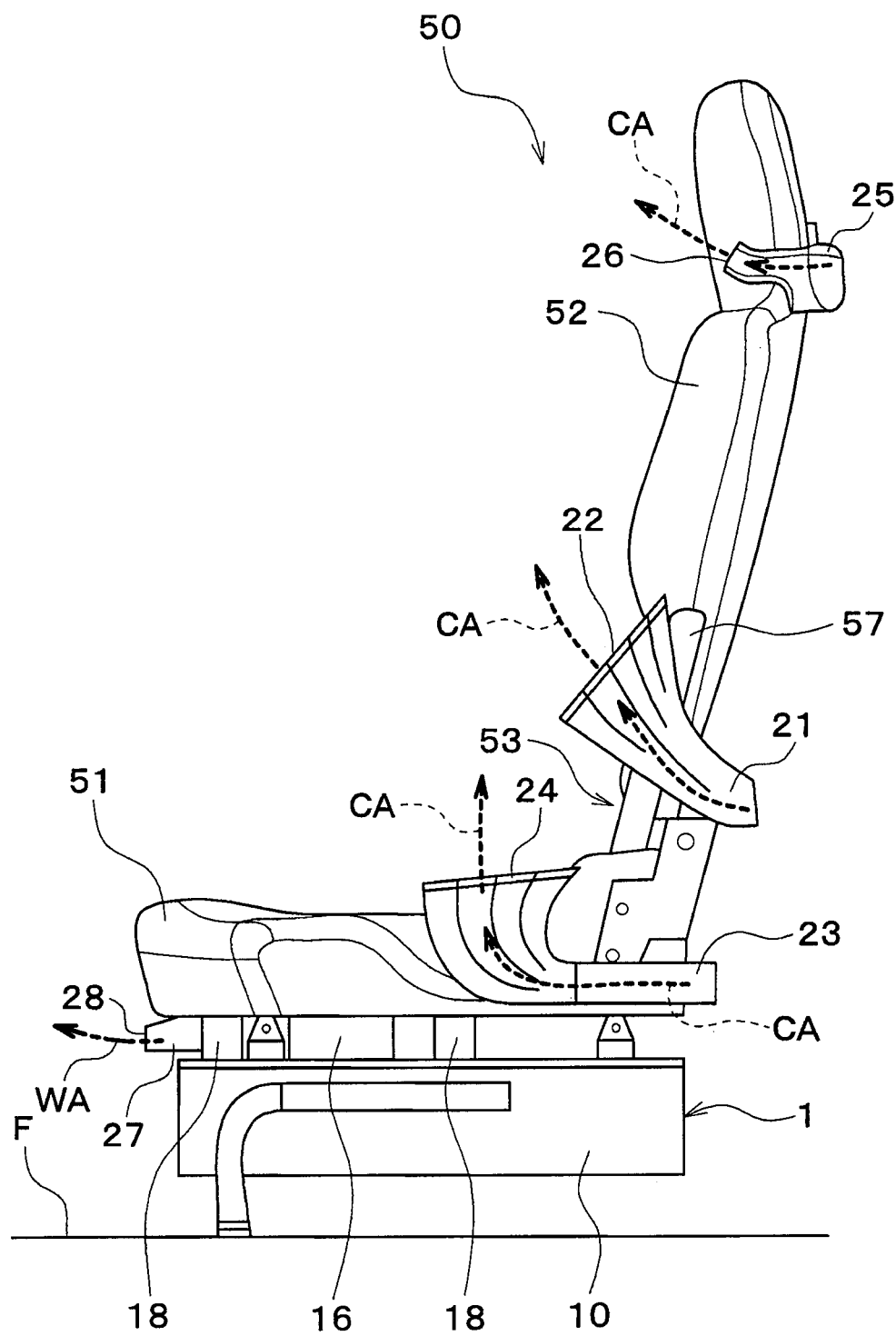
FIG. 12 is a side view illustrating flows of warm air and cold air in the second supply mode.

As shown in FIGS. 11 and 12, in the second supply mode, the cold air CA flowing through the main duct 21 is blown out from the main outlets 22 located on the left and right sides of the backrest part 52 frontward and diagonally upward. The main outlets 22 are bent inward in the width direction of the seat 50 on both right and left sides of the backrest part 52. Therefore, the cold air CA is blown out toward the body of the occupant on the seat 50.

The cold air CA flowing through the leg duct 23 is blown upward from the leg outlets 24 located on the left and right sides of the seat portion 51. The leg outlets 24 are bent inward in the width direction of the seat 50 on both right and left sides of the seat portion 51. Therefore, the cold air CA is blown out toward the leg such as thigh of the occupant on the seat 50.

The cold air CA having flowed through the upper duct 25 is blown forward from the upper outlets 26 located on the left and right sides of the upper portion (for example, the headrest portion) of the backrest part 52. The head of the occupant on the seat 50 is located near the top of the backrest part 52. Therefore, the cold air CA is blown toward the head of the occupant on the seat 50.

The warm air WA having flowed through the lower duct 27 is blown forward from the lower outlet 28 located at the lower front side of the seat portion 51. The knee to the toe of the occupant on the seat 50 is located at the lower front side of the seat portion 51. Therefore, the warm air WA is blown toward the feet of the occupant on the seat 50.

As shown in FIGS. 11 and 12, in the second supply mode, the seat air conditioner 1 cools the body above the leg of the occupant on the seat 50 by supplying the cold air CA while the feet of the occupant can be warmed by the warm air WA. That is, the seat air conditioner 1 can effectively utilize the warm air WA and the cold air CA generated by the refrigeration cycle 2.

In the case of a high temperature environment such as summer, it is important to cool the occupant to improve the comfort of the occupant. However, if the tow of the occupant is excessively cooled, the comfort of the occupant may be reduced.

In this respect, in the second supply mode, the cold air CA from the main duct 21 and the upper duct 25 cools the occupant and enhances the comfort, while the warm air WA from the lower duct 27 can warm the foot of the occupant. That is, the seat air conditioner 1 can improve the comfort of the occupant in a high temperature environment by operating in the second supply mode, and at the same time, can suppress the decrease in the comfort of the occupant caused by cooling the toe.

Further, in the second supply mode, the seat air conditioner 1 does not waste the warm air WA and the cold air CA generated by the refrigeration cycle 2 and effectively utilizes both the warm air WA and the cold air CA to improve the comfort as a whole by decreasing the discomfort caused by cooling the toes. That is, the seat air conditioner 1 can appropriately supply the warm air WA and the cold air CA to different parts of the occupant, by operating in the second supply mode, and can improve the comfort of the occupant.

As described above, in the seat air conditioner 1 according to the first embodiment, the vapor compression refrigeration cycle 2 and the air blower 7 are housed inside the housing 10 which is disposed in the space between the seat portion 51 of the seat 50 and the cabin floor surface F. The seat air conditioner 1 sends the warm air WA and cold air CA by adjusting the temperature of the air sent by the air blower 7 with the condenser 4 and the evaporator 6 of the refrigeration cycle 2 to improve the comfort of the occupant on the seat 50.

As shown in FIGS. 7 to 12, the seat air conditioner 1 supplies the warm air WA generated by the condenser 4 and the cold air CA generated by the evaporator 6 to the duct member such as the main duct 21 or the second seat frame 57 by controlling the conditioning air supply unit 30. Therefore, it is possible to use the warm air WA and the cold air CA for different purposes (for example, the sites to be air-conditioned or the purposes of air conditioning).

As described above, according to the seat air conditioner 1 of the first embodiment, it is possible to effectively utilize the warm air WA generated by the condenser 4 of the refrigeration cycle 2 and the cold air CA generated by the evaporator 6 without wasting the warm air WA or the cold air CA.

In the seat air conditioner 1 according to the first embodiment, the main duct 21, the leg duct 23, the upper duct 25, and the lower duct 27 respectively extend to different parts of the seat 50, to blow out the warm air WA or the cold air CA.

Therefore, according to the seat air conditioner 1, the warm air WA and the cold air CA are respectively provided to the area requiring heating by the warm air WA and the area requiring cooling by the cold air CA via the main duct 21 and the like. The comfort of the occupant on the seat 50 can be further efficiently enhanced.

As shown in FIG. 7, FIG. 9, and FIG. 10, the seat air conditioner 1 controls the conditioning air supply unit 30 in the first supply mode, so that the upper outlet 26 disposed at the top of the backrest part 52 can blow out the cold air CA while the warm air WA is blown out from the main outlet 22, the leg outlet 24, and the lower outlet 28 which are located below the upper outlet 26.

As a result, the seat air conditioner 1 can warm the lower body of the occupant while keeping the head of the occupant on the seat 50 in a low temperature environment by operating in the first supply mode, to realize so-called, head-cooled and foot-warmed state.

That is, the seat air conditioner 1 can secure the safety of the occupant by restricting a lowering in the occupant's brain function caused by a hot flash, in winter, at the same time, while the comfort of the occupant is raised. Further, also in the first supply mode, since the warm air WA and the cold air CA are used, the seat air conditioner 1 can contribute to energy saving while enhancing the comfort of the occupant.

As shown in FIG. 8, FIG. 11 and FIG. 12, the seat air conditioner 1 controls the conditioning air supply unit 30 in the second supply mode, whereby the cold air CA can be blown out from the main outlet 22, the leg outlet 24 and the upper outlet 26, and the warm air WA can be blown out from the lower outlet 28 located below the seat portion 51.

Thus, the seat air conditioner 1 can cool the upper body of the occupant while warming the foot of the occupant on the seat 50 by operating in the second supply mode. That is, the seat air conditioner 1 can improve the comfort of the occupant in summer and at the same time can suppress the discomfort of the occupant caused by cooling the toes. Accordingly, the comfort of the occupant can be effectively improved. Further, also in the second supply mode, since the warm air WA and the cold air CA are used, the seat air conditioner 1 can contribute to energy saving while enhancing the comfort of the occupant.

Moreover, in the seat air conditioner 1, the air conditioning controller 40 controls the conditioning air supply unit 30 to switch the first supply mode shown in FIG. 9 and the second supply mode shown in FIG. 11 from each other.

Thus, the seat air conditioner 1 can change the supply mode of the warm air WA and the cold air CA according to the request of the occupant, the environment around the seat 50, and the like to further improve the comfort of the occupant on the seat 50.

As shown in FIGS. 1 to 4, the seat air conditioner 1 is disposed between the seat portion 51 of the seat 50 and the cabin floor surface F, and is made in a small unit in which the compressor 3, the condenser 4, the expansion valve 5, and the evaporator 6 of the refrigeration cycle 2, and the air blower 7 are housed in the box-shaped housing 10.

Therefore, since the seat air conditioner 1 is made into a small unit including the refrigeration cycle 2 and the air blower 7, a space for arranging and positioning the seat air conditioner 1 in the vehicle cabin can be restrained small. The seat air conditioner 1 can be arranged in a narrow space between the seat portion 51 and vehicle floor surface F. In addition, since the refrigeration cycle 2 and the air blower 7 are held in the housing 10, the workability can be enhanced at the time of disposing and performing maintenance of the seat air conditioner 1.

Second Embodiment

A second embodiment different from the first embodiment will be described with reference to the drawings. A seat air conditioner 1 according to the second embodiment is applied to an electric vehicle which travels by power of a battery in a manner similar to the first embodiment. In the following description, the same reference signs as those of the first embodiment designate identical elements, and the preceding description will be referred to.

The seat air conditioner 1 of the second embodiment is the same as that of the first embodiment mentioned above except the housing 10 and the structure housed in the housing 10. That is, the description for the configuration of the seat 50 and the arrangement configuration of the duct member such as the main duct 21 or the like is referred to the above-described first embodiment.

Also in the second embodiment, the seat air conditioner 1 is disposed in a small space between the seat portion 51 of the seat 50 and the cabin floor surface F in the electric vehicle. The conditioned air adjusted to an appropriate temperature such as the warm air WA and the cold air CA are supplied to enhance the comfort of the occupant on the seat 50.

Figure 13:
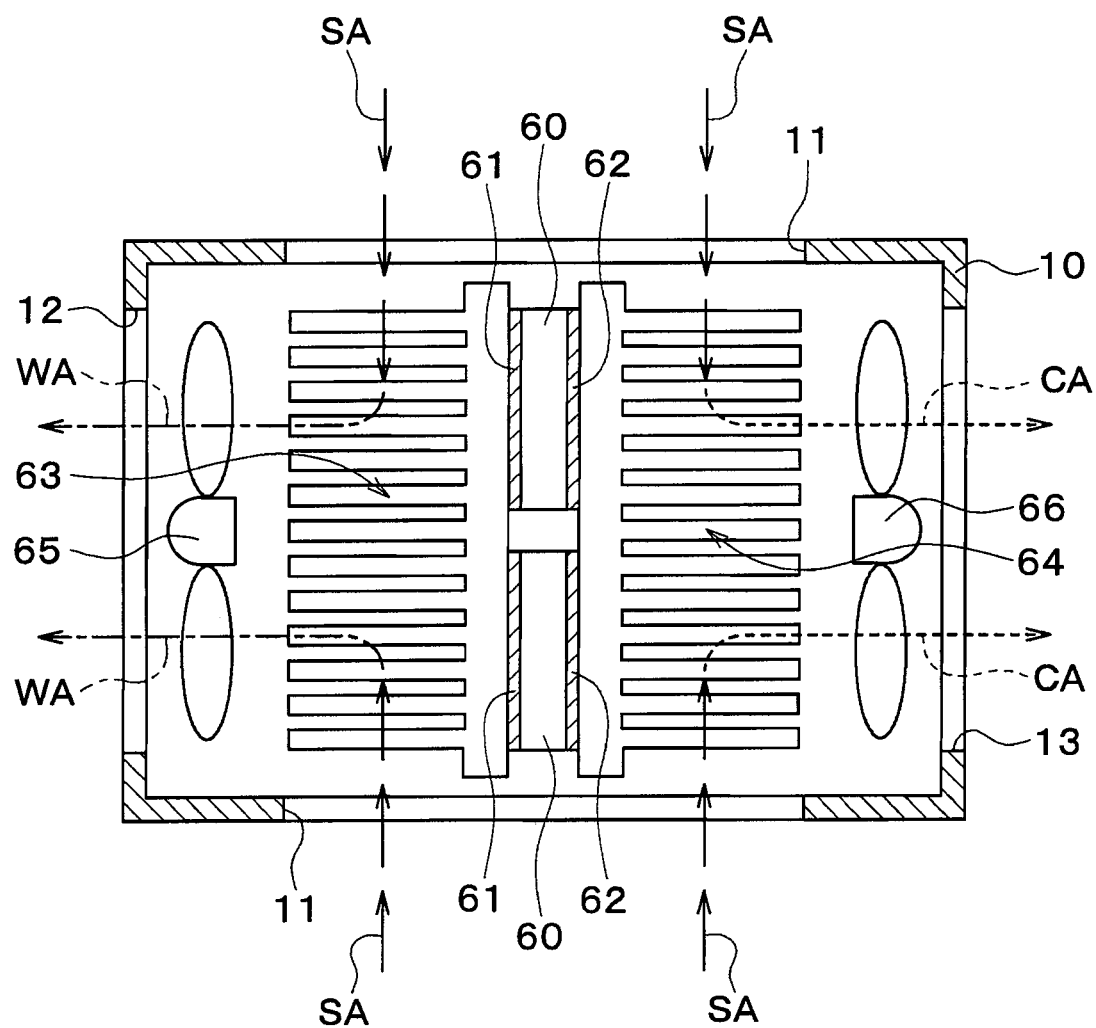
FIG. 13 is an explanatory view illustrating an internal configuration of a seat air conditioner according to a second embodiment.

As shown in FIG. 13, the seat air conditioner 1 according to the second embodiment includes a Peltier element 60, a first fin member 63, a second fin member 64, a first blower 65, and a second blower 66 which are housed in the housing 10.

As in the first embodiment, the housing 10 according to the second embodiment is formed in a small box shape that can be located between the seat portion 51 and the vehicle floor surface F. Further, the housing 10 has an air inlet 11, a warm air outlet 12, and a cold air outlet 13. The air inlet 11 introduces air outside the housing 10 into the housing 10 as intake air SA. A warm air WA warmed by the Peltier element 60 is blown out from the warm air outlet 12. A cold air CA cooled by the Peltier element 60 is blown out from the cold air outlet 13.

The Peltier element 60 is a plate-like semiconductor device configured by connecting two metals. Alternatively, the Peltier element 60 is configured by connecting metal and semiconductor. The Peltier element 60 is configured to cause a Peltier effect when a direct current flows through a junction of the two metals. Due to the Peltier effect, when direct current is applied to the junction of the two metals, heat transfers from one metal to the other metal, such that heat absorption occurs on one side and simultaneously heat emission occurs on the other side. Therefore, in the second embodiment, when a direct current flows through the junction of the Peltier element 60, heat is emitted from the heat radiating portion 61, and heat is absorbed by the heat absorbing portion 62 opposite from the heat emitting portion 61.

As shown in FIG. 13, in the seat air conditioner 1 according to the second embodiment, plural Peltier elements 60 are disposed in the housing 10, and the positional relationship of the heat emitting portion 61 and the heat absorbing portion 62 are in agreement all among the Peltier elements 60.

The first fin member 63 is a heat transfer member having plural fins formed in a plate shape made of a metal (specifically, aluminum, copper or the like) excellent in heat conductivity. The first fin member 63 is fixed in contact with the heat emitting portion 61 of the Peltier elements 60. The first fin member 63 has a function of emitting the heat from the heat emitting portion 61 of the Peltier element 60 to the surrounding air.

Similar to the first fin member 63, the second fin member 64 is a heat transfer member having plural fins formed in a plate shape made of a metal (specifically, aluminum, copper or the like) having excellent heat conductivity. The second fin member 64 is fixed in contact with the heat absorbing portion 62 of the Peltier elements 60. The second fin member 64 is cooled by heat absorption by the heat absorbing portion 62 of the Peltier element 60, and exchanges heat with the surrounding air. Accordingly, the heat absorbing portion 62 of the Peltier element 60 cools the air introduced into the housing 10 through the second fin member 64.

The first blower 65 is disposed between the warm air outlet 12 and the first fin member 63 inside the housing 10. The first blower 65 introduces air from the outside of the housing 10 through the air inlet 11, and blows the air from the warm air outlet 12 to the outside of the housing 10 through the first fin member 63. In the second embodiment, the intake air SA sucked from the air inlet 11 is warmed by the heat emitting portion 61 of the Peltier element 60 via the first fin member 63 and blown out from the warm air outlet 12 as the warm air WA.

As shown in FIG. 13, the second blower 66 is disposed between the cold air outlet 13 and the second fin member 64 inside the housing 10. The second blower 66 introduces air from the outside of the housing 10 through the air inlet 11, and blows the air from the cold air outlet 13 to the outside of the housing 10 through the second fin member 64. Therefore, the intake air SA sucked from the air inlet 11 is cooled by the heat absorbing portion 62 of the Peltier element 60 via the second fin member 64 while flowing around the second fin member 64, and is blown out from the cold air outlet 13 as the cold air CA.

Therefore, the seat air conditioner 1 according to the second embodiment adjusts the temperature of the air sent by the first blower 65 and the second blower 66 by the heat emitting portion 61 and the heat absorbing portion 62 of the Peltier element 60, and supplies the warm air WA and the cold air CA to the occupant on the seat 50 through the seat 50, the main duct 21, and the like.

Also in the second embodiment, the warm air outlet 12 is connected to the conditioning air supply unit 30 via the warm air side connection member 17, and the cold air outlet 13 is connected to the conditioning air supply unit 30 via the cold air side connection member 18.

In the seat air conditioner 1 according to the second embodiment, the Peltier element 60, the first blower 65, the second blower 66, and the conditioning air supply unit 30 are connected to the output side of the air conditioning controller 40. Therefore, the air conditioning controller 40 can control the heat emitting performance of the heat emitting portion 61 and the heat absorption performance of the heat absorbing portion 62 in the Peltier element 60 by controlling the current on the Peltier element 60. In addition, the air conditioning controller 40 can adjust the blowing performance (for example, the blowing amount) by the first blower 65 and the second blower 66 according to the situation.

Also in the second embodiment, the air conditioning controller 40 controls the conditioning air supply unit 30, so that the warm air WA supplied from the warm air outlet 12 and the cold air CA supplied from the cold air outlet 13 can be distributed suitably among ducts, such as the main duct 21. That is, also in the seat air conditioner 1 according to the second embodiment, the warm air WA and the cold air CA adjusted by the Peltier element 60 can be appropriately supplied to different portions of the seat 50.

Furthermore, according to the seat air conditioner 1 of the second embodiment, as in the first embodiment, the supply mode of the conditioning air is changed between the first supply mode shown in FIGS. 7, 9 and 10 and the second supply mode shown in FIGS. 8, 11, and 12 by controlling the conditioning air supply unit 30. The effects of the first supply mode and the effects of the second supply mode are the same as those of the first embodiment described above, and thus the description thereof will not be repeated.

Moreover, also in the seat air conditioner 1 of the second embodiment, the supply mode of the conditioning air is switched according to various opportunity. For example, the mode is switched to the first supply mode or the second supply mode according to an operation of the occupant input via the operation panel or the like, and the environmental conditions such as the outdoor temperature (i.e., the outside temperature).

As described above, the seat air conditioner 1 according to the second embodiment includes the Peltier element 60, the first fin member 63, the second fin member 64, the first blower 65, and the second blower 66 received inside the housing 10 disposed in the space between the seat portion 51 of the seat 50 and the cabin floor surface F. The seat air conditioner 1 adjusts the temperature of the air blown by the first blower 65 and the second blower 66 by the heat emitting portion 61 and the heat absorbing portion 62 as the Peltier element 60 is energized, so that the warm air WA and the cold air CA are sent to enhance the comfort of the occupant on the seat 50.

The seat air conditioner 1 according to the second embodiment can supply the warm air WA generated by the heat emitting portion 61 and the cold air CA generated by the heat absorbing portion 62 by controlling the conditioning air supply unit 30 to the duct member such as the main duct 21 and the second seat frame 57. Accordingly, the warm air WA and the cold air CA can be used for different purposes (for example, sites to be air-conditioned or purposes for air-conditioning).

As described above, according to the seat air conditioner 1 of the second embodiment, it is possible to effectively utilize both of the warm air WA generated by the heat emitting portion 61 of the Peltier element 60 and the cold air CA generated by the heat absorbing portion 62 without wasting the warm air WA or the cold air CA.

Further, also in the seat air conditioner 1 according to the second embodiment, the main duct 21, the leg duct 23, the upper duct 25 and the lower duct 27 extend to different portions in the seat 50 as in the first embodiment, to blow out the warm air WA or the cold air CA.

Therefore, according to the seat air conditioner 1, the warm air WA and the cold air CA are respectively provided to the area requiring heating by the warm air WA and the area requiring cooling by the cold air CA via the main duct 21 and the like. Accordingly, the comfort of the occupant on the seat 50 can be further efficiently enhanced.

In the seat air conditioner 1 of the second embodiment, the supply mode of the conditioning air can be made into the first supply mode by controlling the conditioning air supply unit 30. Thus, the seat air conditioner 1 can warm the lower body of the occupant while keeping the head of the occupant on the seat 50 in a low temperature environment, thereby realizing a so-called head-cooled and foot-warmed condition.

That is, the seat air conditioner 1 can secure the safety of the occupant by restricting a lowering in the occupant's brain function caused by hot flash in winter, and at the same time, can raise the comfort of the occupant. Further, also in the first supply mode, since the warm air WA and the cold air CA are used, the seat air conditioner 1 can contribute to energy saving while enhancing the comfort of the occupant.

Furthermore, the seat air conditioner 1 according to the second embodiment can set the supply mode of the conditioning air to the second air supply mode by controlling the conditioning air supply unit 30. Thus, the seat air conditioner 1 can cool the upper body of the occupant while warming the foot of the occupant on the seat 50.

That is, the seat air conditioner 1 can improve the comfort of the occupant in summer and at the same time can suppress the discomfort of the occupant caused by cooling the toes.

Thus, the comfort of the occupant can be effectively improved. Further, also in the second supply mode, since the warm air WA and the cold air CA are used, the seat air conditioner 1 can contribute to energy saving while improving the comfort of the occupant.

In the seat air conditioner 1 of the second embodiment, when the air conditioning controller 40 controls the conditioning air supply unit 30, the first supply mode shown in FIG. 9 and the second supply mode shown in FIG. 11 can be switched from each other.

Thus, the seat air conditioner 1 can change the supply mode of the warm air WA and the cold air CA according to the request of the occupant, or the environment around the seat 50, to further improve the comfort of the occupant.

Third Embodiment

The third embodiment different from the above embodiments will be described with reference to FIG. 14 and FIG. 15. The seat air conditioner 1 of the third embodiment is applied to an electric vehicle which drives with the electric power of a battery similarly to above embodiments. In the following explanation, the same numerals as each embodiment mentioned above show the same composition, and refer to the preceding explanation.

The seat air conditioner 1 according to the present embodiment is the same as the seat air conditioner 1 of the above embodiment except that a lower seat heater 70 is disposed in the seat portion 51 of the seat 50 and that an upper seat heater 71 is disposed in the backrest part 52. That is, the configuration of the seat 50 and the arrangement configuration of the duct members such as the main duct 21 or the like are referred to the description in the first embodiment.

In this case, the housing 10 and the inside configuration of the housing 10 may be referred to FIGS. 3 and 4 in which the refrigeration cycle 2 and the air blower 7 are arranged, or may be referred to FIG. 13 using the Peltier element 60.

Figure 14:
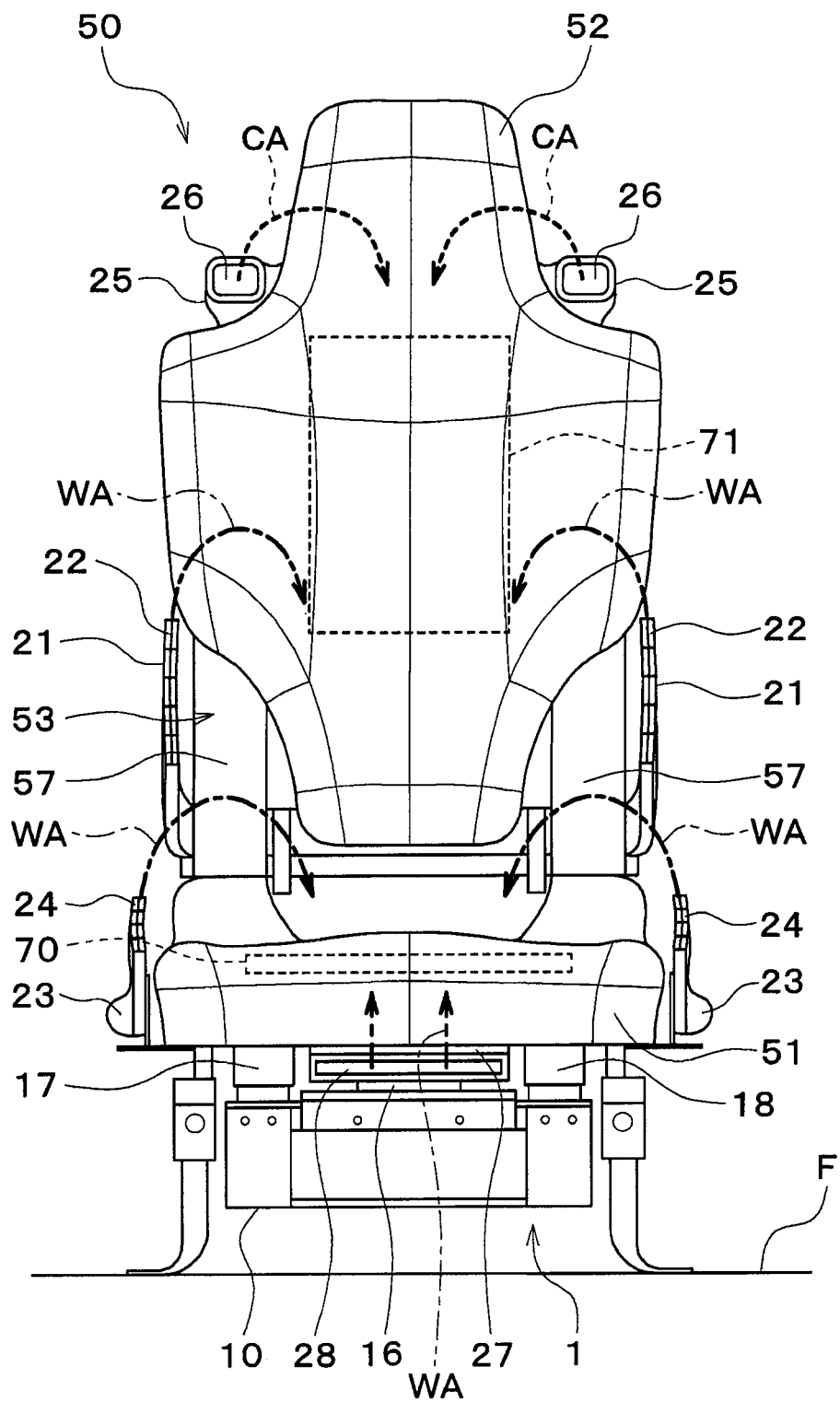
FIG. 14 is a front view illustrating a seat air conditioner according to a third embodiment.
Figure 15:
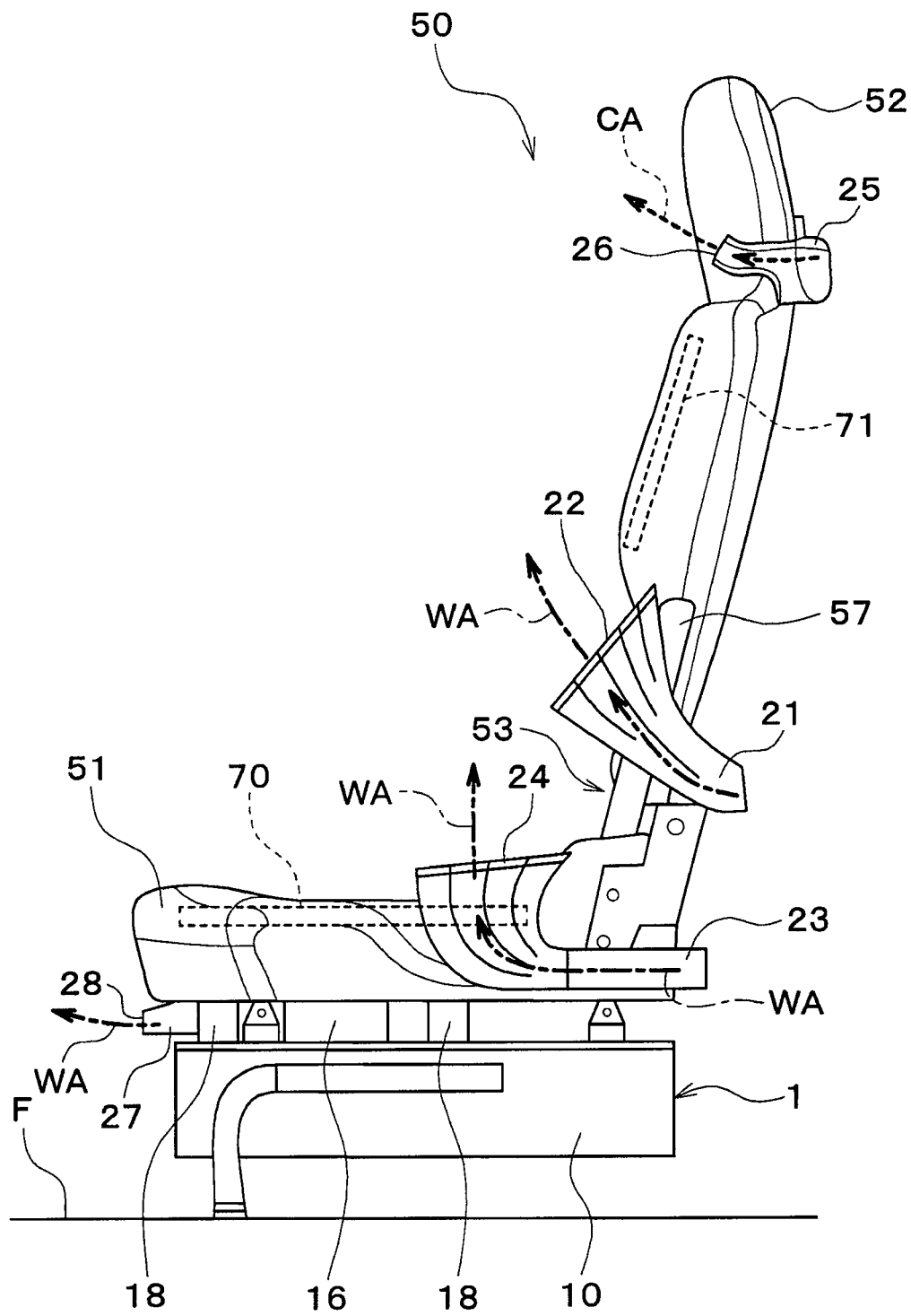
FIG. 15 is a side view illustrating the seat air conditioner according to the third embodiment.

In the third embodiment, as shown in FIGS. 14 and 15, the lower seat heater 70 is disposed adjacent to the upper surface of the seat portion 51 of the seat 50. The lower seat heater 70 is formed in a thin plate made of a material having high thermal conductivity, and is configured to generate heat by receiving power supply. That is, the lower seat heater 70 constitutes a part of an auxiliary heating unit.

The lower seat heater 70 has a cushioning material so as to cover the upper part thereof. The cushioning material is disposed between the upper surface of the seat portion 51 and the lower seat heater 70, to secure a softness when an occupant on the seat 50 is in contact with the seat portion 51.

The upper seat heater 71 is disposed adjacent to the front side of the backrest part 52 in the seat 50. Similar to the lower seat heater 70, the upper seat heater 71 is formed in a thin plate made of a material having high thermal conductivity, and is configured to generate heat when power is supplied. That is, the upper seat heater 71 constitutes a part of an auxiliary heating unit.

The upper seat heater 71 has a cushioning material so as to cover the front side. The cushioning material is disposed between the front surface of the backrest part 52 and the upper seat heater 71, and secures a softness when an occupant on the seat 50 is in contact with the backrest part 52.

As described above, according to the seat air conditioner 1 of the third embodiment, the body of the occupant on the seat 50 can be warmed by the heat from the lower seat heater 70 and the upper seat heater 71 in addition to the warm air WA supplied from the warm air outlet 12.

Thus, for example, as in the first supply mode, in case where the occupant feels cold after being in a called head-cooled and foot-warmed state due to the warm air WA and the cold air CA, the body of the occupant can be warmed by the lower seat heater 70 and the upper seat heater 71. That is, the seat air conditioner 1 according to the third embodiment can improve the comfort of the occupant on the seat 50 even in a lower temperature environment (for example, a cold region).

Also in this case, since the conditioned air is supplied in the first supply mode, the cold air CA supplied from the cold air outlet 13 is blown toward the head of the occupant. That is, even when the body of the occupant on the seat 50 is further warmed, decrease in the brain function due to hot flash can be suppressed, and thus effectively securing the safety in the electric car.

As described above, the seat air conditioner 1 according to the third embodiment has a heating source different from the warm air WA supplied from the inside of the housing 10 by arranging the lower seat heater 70 and the upper seat heater 71 in the seat 50 at the portions in contact with the occupant. Therefore, according to the seat air conditioner 1, the comfort of the occupant on the seat 50 can be improved even in a lower temperature environment.

The seat air conditioner 1 of the third embodiment exhibits the same effects as the above embodiment about the other points. Refer to the preceding explanation for the specific effects regarding the other points.

Other Embodiments

Although the embodiments are described, the present disclosure is not limited at all to the embodiment mentioned above. The present disclosure can be modified variously within a range not departing from the gist of the present disclosure. For example, the embodiments may be combined where appropriate. The embodiments can alternatively be modified variously as follows, for example.

(1) The first supply mode shown in FIG. 7 and the second supply mode are mentioned in the above embodiment, but the supply mode of the conditioning air is not limited while the warm air WA and the cold air CA generated in the refrigeration cycle 2 are supplied to different parts of the seat 50.

For example, the supply mode of the conditioned air does not have to be a mode in which the warm air WA or the cold air CA is blown out from all of the main duct 21, the leg duct 23, the upper duct 25, and the lower duct 27. When the conditioned air (i.e., warm air WA or cold air CA) is blown out from a part of the main duct 21, the leg duct 23, the upper duct 25, and the lower duct 27, the supply of the conditioned air may be stopped in the other ducts.

(2) Also, in the embodiment described above, in the second supply mode, the cold air CA is blown out from the main duct 21, the leg duct 23, and the upper duct 25, and the warm air WA is blown out only from the lower duct 27 by controlling the conditioning air supply unit 30, but is not limited to this.

For example, in the second supply mode, the cold air CA is blown out from the main duct 21 and the upper duct 25, and the warm air WA is blown out from the leg duct 23 in addition to the lower duct 27 by controlling the conditioning air supply unit 30. Accordingly, it is possible to cool the upper body of the occupant on the seat 50 and to warm the waist and the thigh in addition to the feet of the occupant.

That is, to suppress the discomfort, it is possible to warm the entire lower body of the occupant whose feet are extremely cold. Accordingly, it is possible to provide comfort according to the cold degree in the feet.

(3) In the above embodiments, the seat air conditioner 1 is fixed to the lower face of the seat portion 51 of the seat 50, but is not limited to this, such that the seat air conditioner 1 is disposed slidably together with the seat 50 in the front-rear direction of the vehicle.

For example, the housing 10 of the seat air conditioner 1 is fixed at a predetermined position on the cabin floor surface F, and the air inlet 11, the warm air outlet 12, and the cold air outlet 13 of the housing 10 can be respectively connected to the seat 50 by the central connection member 16, the warm air side connection member 17 and the cold air side connection member 18 formed in an expandable tubular shape. In this case, the central connection member 16 and the like may be made of, for example, a flexible duct formed in a bellows shape.

What is claimed is:

1. A seat air conditioner configured to supply conditioning air to a seat in a vehicle cabin, comprising:
 a refrigeration cycle including a compressor that compresses and discharges a refrigerant, a heat emitting portion that emits heat of the refrigerant discharged from the compressor to generate a warm air, a decompressor that decompresses the refrigerant flowing out of the heat emitting portion, and a heat absorbing portion that evaporates the refrigerant decompressed by the decompressor to generate a cold air;
 a housing disposed between a seal portion of the seat and a floor surface of the vehicle cabin in a vertical direction;
 an air blower that blows air to exchange heat with the refrigerant; and
 a conditioning air supply unit that simultaneously supplies each of the warm air generated by the heat emitting portion and sent through the air blower and the cold air generated by the heat absorbing portion and sent through the air blower as the conditioning air to the seat, wherein
 the conditioning air supply unit supplies the warm air and the cold air respectively to different portions of the seat, and
 the housing houses the compressor, the heat emitting portion, the decompressor, and the heat absorbing portion of the refrigeration cycle, and the air blower.

2. The seat air conditioner according to claim 1, wherein the conditioning air supply unit has
 an upper outlet disposed at an upper portion of a backrest part of the seat to blow out the cold air, and
 an intermediate outlet located below the upper outlet in the backrest part to blow out the warm air.

3. The seat air conditioner according to claim 1, wherein the conditioning air supply unit has
 an intermediate outlet disposed in a backrest part of the seat to blow out the cold air, and
 a lower outlet disposed in a seat portion of the seat to blow out the warm air.

4. The seat air conditioner according to claim 1 further comprising:
 a controller that controls the conditioning air supply unit, wherein the controller is configured to switch a first supply mode and a second supply mode from each other,
 the cold air is blown out from an upper outlet disposed at an upper portion of a backrest part of the seat, and the warm air is blown out from an intermediate outlet located below the upper outlet in the backrest part in the first supply mode, and the cold air is blown out from the intermediate outlet, and the warm air is blown out from a lower outlet disposed in a seat portion of the seat in the second supply mode.

5. The seat air conditioner according to claim 1, further comprising: an auxiliary heating unit located adjacent to a surface of the seat in contact with an occupant to emit a warm heat.

6. The seat air conditioner according to claim 1, further comprising:
- a controller that controls the conditioning air supply unit, wherein
- the controller is configured to switch a first supply mode and a second supply mode from each other,
- the conditioning air supply unit has a plurality of upstream passages, a plurality of downstream passages, and a passage switching mechanism disposed at a connection between the plurality of upstream passages and the plurality of downstream passages,
- the passage switching mechanism is configured to switch a flow of the conditioned air at a downstream of the connection, and
- the controller controls the passage switching mechanism to switch the first supply mode and the second supply mode from each other, such that the cold air and the warm air are blown out from outlets at different positions on the seat.

7. The seat air conditioner according to claim 6, wherein
- the housing has an air inlet, a warm air outlet to output the warm air and a cold air outlet to output the cold air,
- the conditioning air supply unit is connected to the warm air outlet and the cold air outlet of the housing, and
- the conditioning air supply unit has an intermediate outlet located in a backrest part to blow out the warm air or the cold air by switching the first supply mode and the second supply mode from each other.

8. The seat air conditioner according to claim 7, wherein the conditioning air supply unit has
- an upper outlet disposed at an upper portion of the backrest part of the seat to blow out the cold air, and
- a lower outlet disposed in the seat portion of the seat to blow out the warm air, and
- the intermediate outlet is located below the upper outlet in the backrest part.

* * * * *